July 6, 1965 M. J. KRAWACKI Re. 25,818

ROTARY MOTION APPARATUS

Original Filed Nov. 18, 1959 7 Sheets-Sheet 1

INVENTOR.
MICHAEL J. KRAWACKI

BY Drumbaugh, Tree, Graves & Donohue his ATTORNEYS

ROTARY MOTION APPARATUS

Original Filed Nov. 18, 1959 7 Sheets-Sheet 2

INVENTOR.
MICHAEL J. KRAWACKI

BY Brumbaugh, Free, Graves & Donohue his ATTORNEYS

ROTARY MOTION APPARATUS

Original Filed Nov. 18, 1959 7 Sheets-Sheet 3

INVENTOR.
MICHAEL J. KRAWACKI
BY Brumbaugh, Free, Graves + Donohue
his ATTORNEYS

ROTARY MOTION APPARATUS

Original Filed Nov. 18, 1959 7 Sheets-Sheet 4

INVENTOR.
MICHAEL J. KRAWACKI

BY Brumbaugh, Free, Graves & Donohue
his ATTORNEYS

INVENTOR.
MICHAEL J. KRAWACKI

BY Brumbaugh, Free, Graves + Donohue
his ATTORNEYS

INVENTOR.
MICHAEL J. KRAWACKI
BY Brumbaugh, Free, Graves & Donohue
his ATTORNEYS

INVENTOR.
MICHAEL J. KRAWACKI

BY Brumbaugh Free, Graves + Donohue his ATTORNEYS

United States Patent Office

Re. 25,818
Reissued July 6, 1965

25,818
ROTARY MOTION APPARATUS

Michael J. Krawacki, Englishtown, N.J., assignor to Trojan Corporation, Plainfield, N.J., a corporation of New Jersey Original No. 3,033,122, dated May 8, 1962, Ser. No. 853,912, Nov. 18, 1959. Application for reissue Mar. 20, 1963, Ser. No. 268,511
20 Claims. (Cl. 103—139)

Matter enclosed in heavy brackets [ ] appears in the original patent but forms no part of this reissue specification; matter printed in italics indicates the additions made by reissue.

The present application is a continuation-in-part of my copending application Serial No. 813,592 filed May 15, 1959, *now U.S. Patent No. 3,166,019 issued January 19, 1965* which, in turn, is a continuation-in-part of my copending application Serial No. 775,244 filed November 20, 1958, now abandoned.

This invention relates generally to apparatus, such as fluid pumps and motors, in which there occurs an energy transfer between a mechanical part and a liquid or gaseous fluid. More particularly, this invention relates to apparatus of this sort which is characterized by aligned impulsion and rotary motion.

By "aligned impulsion" is meant an energy transfer action between a mechanical part and a fluid wherein the fluid impels the part or is impelled thereby, and wherein the motion of the part is aligned in direction with the movement of the fluid in the course of the energy transfer action. Such alignment is present, for example, in a reciprocating steam engine wherein the motion of the piston is aligned with the direction of expansion of the steam in the cylinder. It is not present in turbo-pumps or turbo-motors wherein the motion of the rotating blades is at right angles to the direction of travel of the fluid contained within the pump or motor. Hence, in respect to the feature of aligned impulsion, the apparatus to which this invention relates is like reciprocating fluid pumps or engines, and unlike turbo-pumps or turbo-motors. However, the apparatus of the present invention is unlike reciprocating machines, and like turbo-pumps or turbo-motors, in that it is characterized by rotary motion. Hence, the apparatus to which this invention relates is rotary motion, aligned impulsion apparatus which combines in one machine the advantage found in reciprocating machines of the high efficiency which is provided by the aligned impulsion, and, also, the advantages found in turbo-machines (and which is provided by the rotary motion) of unidirectional continuous operation and of freedom both from mechanical vibration and from fluid vibration (pulsation).

The principal elements of one such rotary motion, aligned impulsion machine are shown schematically in the accompanying first two figures of the figures listed below wherein.

Figure 1:
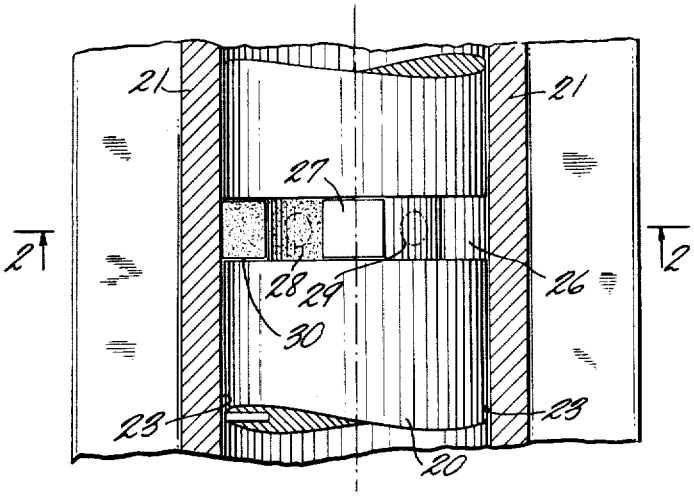
FIG. 1 is a partially cut away and plan view of apparatus according to the invention, as such apparatus may be generally represented.
Figure 2:
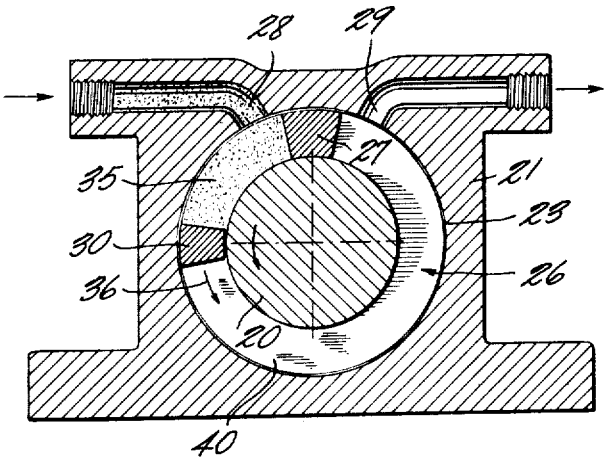
FIG. 2 is a vertical cross section, taken as indicated by the arrows 2—2 in FIG. 1, of such apparatus as it may be generally represented.

In FIGS. 1 and 2 which illustrate the general character of the type of apparatus to which this invention relates, the numbers 20 and 21 refer to a pair of relatively rotatable members in the respective forms of a drum and of a sleeve surrounding the drum.

The sleeve 21 is separated from the drum 20 by a clearance space 23. The clearance between drum and sleeve is selected to permit free relative rotation of these members while, at the same time, limiting, insofar as is practicable, the flow of fluid in the clearance space.

Other elements of the apparatus include a fluid-receiving groove 26 of any suitable cross section, a reaction block 27 seated in the groove to obstruct or impel flow of fluid therein, a high pressure port 28 opening into the groove 26 on one side of the block 27, a low pressure port 29 opening into the groove on the other side of the reaction block, and a vane or piston 30 of any suitable cross section which angularly rotates relative to the block 27. The vane 30 is normally disposed to obstruct or impel flow of fluid in the groove 26. However, as the vane 30 approaches the block 27 in the course of the relative angular movement therebetween, the vane undergoes an additional movement which is transverse to the said relative movement, but which may be axial or radial or part axial and part radial. The first half of this transverse movement momentarily displaces the vane 30 away from its normal groove obstructing position so as to clear the reaction block 27. The second half of the transverse movement returns the vane 30 to its groove-obstructing position after the vane has passed by the reaction block. A means suitable to produce such transverse movement of the vane is not shown in FIGS. 1 and 2. However, an example of such means will be later described.

Each of the elements in FIGS. 1 and 2 may be one of several. The considered apparatus may include separately, or in any combination thereof, any one or more of the features of one or more annular fluid-receiving grooves, one or more reaction blocks in each groove, and any suitable number of vanes, of which one, some or all may operate either in only one groove or in more than one groove.

If there is more than one groove, the grooves may have differing depths and/or widths, i.e., be of different cross section. The transverse movement of the one or more vanes may be reciprocating, twisting, or oscillatory in character.

In the form of apparatus shown in FIGS. 1 and 2, the sleeve 21 is stationary, the drum 20 is rotatable about its axis, the annular groove 26 is formed in the drum 20, the ports 28 and 29 communicate with the groove 26 through the sleeve 21, the reaction block 27 is coupled in angularly fixed relation with the sleeve 21 to be stationary, and the vane 30 is coupled in angularly fixed relation with the drum 20 to rotate therewith. However, the present invention extends to other forms of apparatus. For example, the drum may be stationary and the sleeve rotatable, in which case the high and low pressure ports will pass through the stationary drum. While the block 27 and the vane 30 are always coupled with opposite ones of the members 20, 21, the block 27 may be coupled to the drum instead of the sleeve, and the vane 30 may be correspondingly coupled to the sleeve instead of the drum. The block 27 may be coupled to either the rotating or the non-rotating one of the members of the drum-sleeve combination. The transverse movement undergone by the vane to pass by the block is in the nature of relative movement between block and vane, and hence may be produced either, as described, by having the vane transversely movable and the block transversely stationary in an absolute sense, or by having the vane transversely stationary and the block and groove transversely movable, or by having both the vane transversely movable and the block and groove transversely movable. As stated the mentioned transverse movement may be either radially directed or axially directed or part axially and part radially directed, i.e., be a motion which is resolvable into axial and radial components.

The apparatus shown in FIGS. 1 and 2 operates as follows as a motor. Gaseous or liquid fluid is introduced into and exhausted from the apparatus at relatively higher and lower pressures by way of the high and low pressure ports 28 and 29 which in this instance act respectively as the inlet port and as the outlet port. The high pressure fluid is represented in FIGS. 1 and 2 by stippling. The high pressure fluid flows from the inlet port 28 into a working chamber 35 whose bounding walls are formed by the annular groove 26, the portion of sleeve 21 which covers the groove, the reaction block 27, and the vane 30. Since the reaction block 27 is stationary and exerts a reactive force on the fluid, the fluid cannot flow angularly in the groove in the clockwise direction. However, since the vane 30 is movable, and since the pressure of the fluid exerts a force on the vane, the vane will be driven counter-clockwise by the fluid. This counter-clockwise rotation of vane 30 is represented in FIG. 2 by the arrow 36.

As the vane 30 moves counter-clockwise, it causes exhaustion through the outlet port 29 of residual fluid in the chamber 40 which is bounded by the groove and sleeve and by the surfaces of the reaction block and vane which are angularly opposite the surfaces thereof which bound the working chamber 35. The vane 30 continues to be driven by the fluid in the working chamber 35 until the vane comes into angular registration with the outlet port 29. Thereupon, the fluid in the working chamber exhausts through the port 29.

Meanwhile, the vane is carried towards the reaction block by the angular monument of the drum. As the vane approaches the block, the vane is caused to undergo (by means not shown in FIGS. 1 and 2) a first motion which displaces the vane transversely to a position where the vane will clear the block. When the vane has passed the block, it undergoes a second transverse motion which returns it to the normal position wherein the vane obstructs the groove. As the vane now moves away from the reaction block, the space opening in the groove between the block and vane is a space which provides a new working chamber for the high pressure fluid from inlet port 28. This high pressure fluid is received into the new working chamber, and the described cycle begins all over again.

The operation just described is the operation of a fluid motor because the apparatus is supplied with an input of fluid energy, this fluid energy is made available by a drop in the pressure of the fluid as it passes through the apparatus, and the apparatus translates such available fluid energy into mechanical energy which is manifested by the rotation of drum 20, and which may be extracted from the apparatus as an output thereof. Obviously, however, the described apparatus is also adapted to operate as a fluid pump either by reversing the high and low pressure fluid connections thereto, or by reversing the direction of rotation of the drum. When operating as a pump by virtue of a reversal in the direction of drum rotation, the ports 28 and 29 are connected as before to communicate respectively with high and low pressure points of the fluid system, but the low pressure port 29 becomes the inlet port, the high pressure port 28 becomes the outlet port, the direction of rotation of drum 20 is reversed, and an input of mechanical energy is supplied to rotate drum 20 and vane 30. Under such circumstances, the fluid will flow through the apparatus from port 29 to port 28. Also, the input of mechanical energy will be translated into increased fluid energy which is manifested by the increased pressure of the fluid at the outlet port 28 as compared to the pressure thereof at the inlet port 29.

It will be noted that the described apparatus when operating as a motor is bidirectional in the sense that the drum can equally well be rotated in either direction simply by reversing the fluid connections thereof to the external fluid system so that port 29 becomes the high pressure port and port 28 the low pressure port. Similarly the described apparatus when operating as a pump is bidirectional in that by reversing the fluid connections and, also, the direction of rotation of the drum, the direction in which the fluid is pumped can be reversed.

For proper operation, the apparatus of FIGS. 1 and 2 should have in the high pressure line a check valve to prevent a short circuit for fluid from the high pressure port around groove 26 and to the low pressure port at the time vane 30 is passing block 27. Such apparatus should also have a check valve in the low pressure line in order to avoid therein a momentary reversal (due to "back" pressure) of the direction of fluid flow during the time vane 30 is passing block 27. As later described in further detail, the need for such check valves or similar accessories is obviated by employing at least two vanes per reaction block.

Rotary motion, aligned impulsion apparatus of the sort described is generally known to the art. Such prior art apparatus is, however, subject to numerous disadvantages, among which may be mentioned excessive friction and binding between parts, excessive wear of such parts, and excessive vibration. The defects just mentioned are caused primarily by the action on various parts in the machine of forces which are neither balanced, minimized to the practical limit, nor effectively counteracted. Such forces, in general, will vary directly with the pressure of the fluid in the machine or directly with the square of the speed of operation of the machine or directly with both.

When the operating pressure is relatively low, and, also, when the speed of operation is relatively low, the machine known to the prior art will be characterized by wear, friction and vibration to an extent which is undesirable. When the fluid pressure and/or the speed of operation are high, the prior art machines will be characterized by wear, friction and vibration to an extent which renders impractical the use of such machines in high pressure, high speed applications.

It is accordingly an object of the invention to provide rotary motion, aligned impulsion apparatus in which the above mentioned disadvantages of friction, wear and vibration are minimized under all pressure and/or speed conditions.

Another object of the invention is to provide apparatus of the stated sort which is well adapted for use in high speed, high pressure applications thereof.

A further object of the invention is to minimize the force required to impart transverse motion to any vane.

A further object of the invention is to increase the capacity (as a pump) or the horsepower (as a motor) of a machine of given size.

These and other objects are realized according to the invention as follows.

From the prior discussion it is evident that one or more vanes of the apparatus are driven transversely by a camming means or equivalent means and the vanes are guided in their transverse motion by being received within slots formed in the member (drum or sleeve) with which the vanes are coupled.

Design considerations often require that apparatus of the sort described be limited in size and yet provide for that size an unusually high capacity when acting as a pump or an unusually high horsepower when acting as a motor. In this connection, I have discovered that the capacity or horsepower of a unit of rotary-motion-aligned impulsion apparatus of given size can be significantly increased by increasing the angular intervals over which the vanes of the apparatus are in transverse motion. I have further discovered that such increase in the mentioned angular intervals can be realized in any one, some, or all of three different ways, namely, (1) by having each such interval at its end towards the nearest reaction block extend beyond the angular location which is marked by the center line of a vane positioned as close as possible to such block while still being under a port; (2) by having each such interval at its end away from the nearest reaction block extend beyond the angular location marked by the center line of such vane when positioned as far as possible from the block while still having equal pressure forces on opposite sides of the vane; and (3) by increasing beyond two the number of vanes per block, this increase in number of vanes per block permitting a reduction in the working interval per vane and a consequent lengthening of the angular intervals over which the vanes undergo transverse motion.

For a better understanding of the invention, reference is made to the following description, the already described FIGS. 1 and 2 of the drawings, and to the remaining figures of the drawings.

Figure 3:
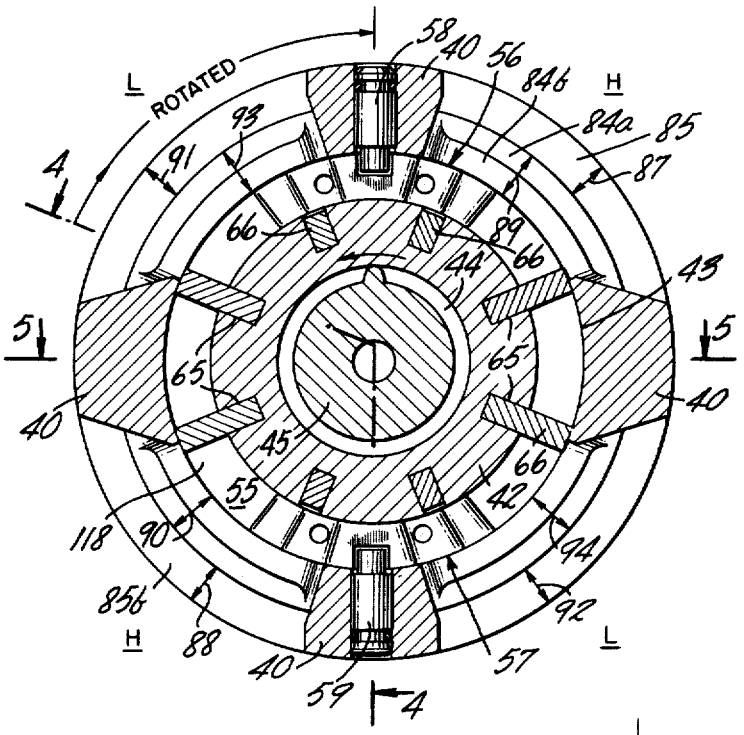
FIG. 3 is an end elevation in cross section of an exemplary practical embodiment of a machine according to the invention, the view in FIG. 3 excluding the outer housing for such machine and being taken as indicated by the arrows 3—3 in FIG. 4.
Figure 4:
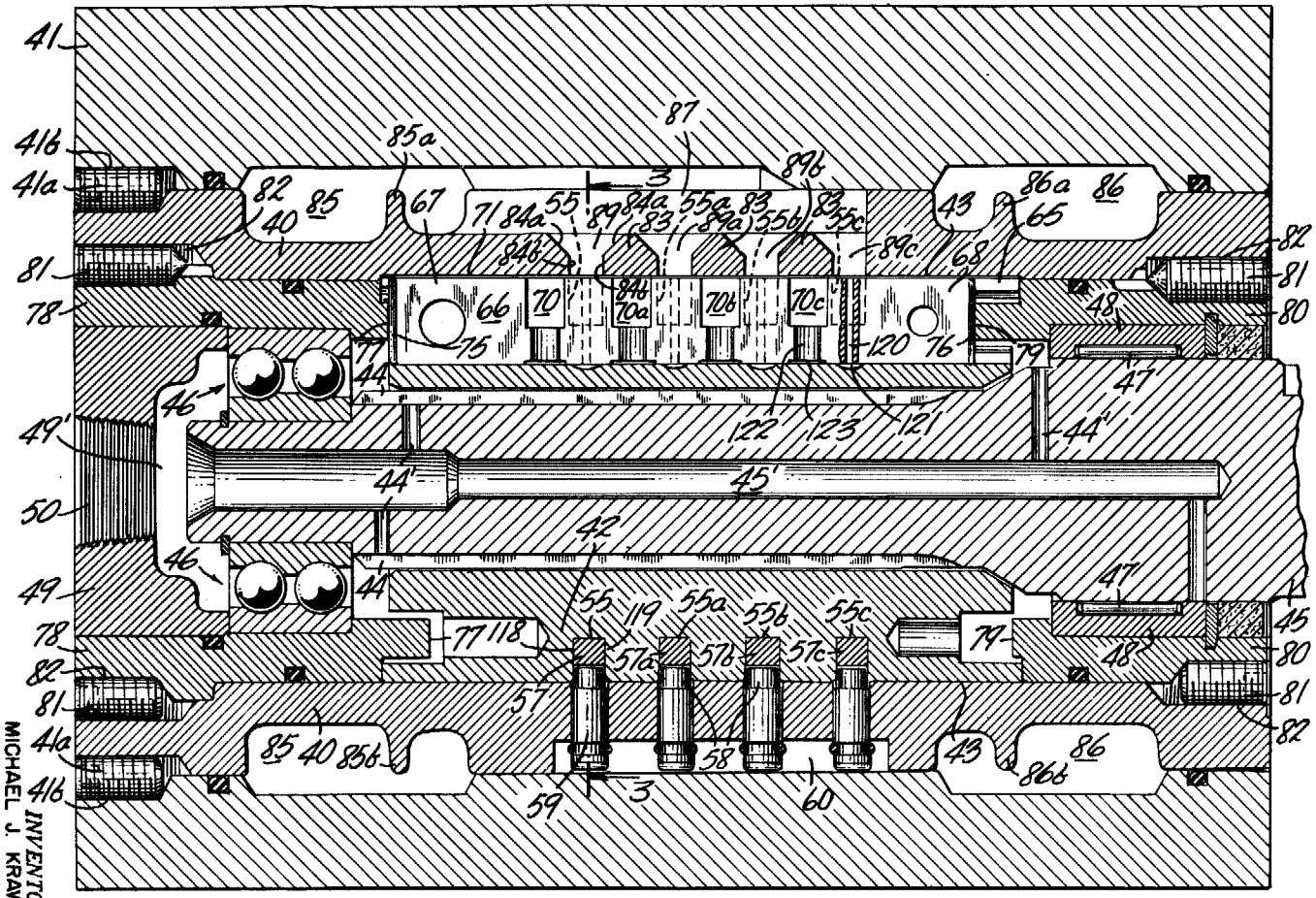
FIG. 4 is a front elevation in cross section of the FIG. 3 machine, the cross section being initially taken as indicated by the arrows 4—4 in FIG. 3, and the upper slanting face of such cross section being then rotated into line with the lower vertical face thereof to arrive at the view of FIG. 4, this view including the outer housing for the machine.

FIGS. 3 and 4 will first be considered. In the embodiment shown in those figures, a stationary bushing 40 is disposed within a cylindrical housing 41 for the apparatus. The inside surface of the bore of the casing and the outside surface of the bushing may have matching slight conical tapers to assure good metal contact between housing and bushing when the latter is axially advanced under pressure into the bore of the former. The axial position of bushing 40 within housing 41 may be adjusted by appropriate rotation of set screws 41a, of which each is threadedly received within a passage 41b, such passage being formed at the interface of housing and bushing so that the circular bore of the passage is provided half by the housing and half by the bushing.

The bushing 40 surrounds and acts as a sleeve for a rotatable drum 42 which is separated from the bushing by an annular, axially extending clearance space 43. The inside surface of the bushing and the outside surface of the drum have matching slight conical tapers permitting adjustment of the amount of clearance therebetween by relative axial adjustment of the drum and the bushing. The clearance between drum and bushing is made as small as is consistent with free rotation of the former within the latter to thereby reduce to a minimum the leakage of fluid through the clearance space.

The cylindrical drum 42 is mounted by a spline coupling 44 on a shaft 45 (FIG. 4) which is mounted for free rotation within the housing 41 by a pair of axially separated bearing assemblies 46 and 47. At its right-hand end the shaft 45 passes out of the housing through a gland 48 adapted to act as a fluid seal. At its left-hand end the shaft terminating short of an end plate 49 which closes off this end of the apparatus. Between this end plate 49 and the adjacent end of shaft 45 there is a space 49′ defining a reservoir for collecting fluid which may find its way through the space 43 or through the (soon to be described) slots which are formed in the drum 42. In order to equalize fluid pressure at opposite ends of the machine, an axial channel 45′ and connecting radial conduits 44′ are formed in the shaft 45. In this way, an axial balance is obtained of the fluid pressure forces acting on the drum 42 and on the (soon to be described) vanes which are received within the slots in the drum. A central aperture 50 in the end plate 49 permits drainage from the apparatus of fluid which has leaked away from the operating zone thereof.

Such operating zone is provided by a set of annular groove 55, 55a, 55b, 55c which are axially of rectangular cross section, and which are formed as a series of axially spaced recesses in the drum 42. Within each such groove are seated in radially opposed relation a pair of reaction blocks. Thus, for example, the groove 55 contains the radially opposed reaction blocks 56 (FIG. 3) and 57. Of the reaction block pairs contained in, respectively, the other grooves 55a, 55b, 55c, the bottom blocks 57a, 57b and 57c are shown in FIG. 4. In the four grooves, the four bottom reaction blocks are mutually aligned to be bisected by the same vertical plane, while, similarly, the four top reaction blocks are mutually aligned to be bisected by that plane.

The reaction blocks 56 and 57 are maintained in *angularly* [axially] fixed relation with the bushing 40 by the pins 58 and 59 (FIG. 3). Similar pins are employed to couple the other reaction blocks in angularly fixed relation with the bushing 40. As shown in FIG. 4, the heads of the four pins for the four bottom reaction blocks are recessed within a slot-like depression 60 formed in the bushing 40. The heads of the pins for the four top reaction blocks are recessed within bushing 40 in a similar manner (not shown).

A further description will later be given of the details of construction of the reaction blocks themselves and of the anchoring means for such reaction blocks.

In addition to the four mentioned grooves 55, 55a, 55b, 55c, there is formed within drum 42 eight axial slots 65 (FIG. 3) disposed at 45° angular intervals about the drum. The slots 65 axially transect the four mentioned grooves and are radially cut into the drum deeper than are those grooves. Received within the slots 65 to be axially slidable therein are a corresponding number of vanes 66. As shown in FIG. 4, each vane 66 has two axially separated end portions 67, 68 and, between those end portions, a series of axially spaced central portions of reduced radial size. Those central portions are created in each vane by a series of rectangular recesses or notches 70, 70a, 70b, 70c which extend into the vane in the radial direction from the margin 71 of the vane which is nearest to the clearance space 43 between the drum 42 and the bushing 40. The mentioned notches correspond to, respectively, the grooves 55, 55a, 55b, 55c. Each notch has an axial and radial extent suitable to contain with clearance either of the reaction blocks within the corresponding groove when the vane is axially shifted rightward from its working position shown in FIG. 4 to the block-passing position for the vane. When a vane is fully in block-passing position, the vertical center line of each of its notches 70, 70a, 70b, 70c coincides with the vertical center line of the corresponding groove formed in the drum 42. Therefore, when a vane is so axially shifted to its block-passing position, the vane is adapted to pass by either all the top reaction blocks or all the bottom reaction blocks as the rotation of the drum 42 causes the vanes to move angularly relative to the reaction blocks. *It will be readily apparent from examination of the somewhat more detailed FIGURE 9 discussed hereinafter from the relative dimensions of the groove 55 and the vane notch 70, that such clearance on either side of the reaction block between the surfaces of the notch and the block is about 3/64 of an inch in the drawing illustrated. Thus, the vane notch width shown is 12/32 inch, the groove width (or block width) is 9/32, leaving a difference of 3/32, half of which is 3/64 inch.*

As stated, the position which is shown for the vane 66 appearing in FIG. 4 is the working position for that vane. The vanes 66 are so constructed that, when any such vane is disposed in its working position, a solid portion of the vane extends across each of grooves 55, 55a, 55b, 55c to thereby render all grooves obstructed by the vane. *In fact, as shown most clearly in FIGURES 4 and 9, there is a substantial overlap between the solid vane portion and the portion of the slot adjacent the groove. The amount of this overlap shown in each of FIGURES 4 and 9, for instance, is about 1/32 of an inch. Such overlap is also shown in somewhat larger scale by the dotted lines marking the outline of the vane 66 of FIGURE 18.* Thus, any vane 66 in working position will obstruct the angular flow of fluid in all grooves when the described machine is operated as a motor or, alternatively, will impel the flow of fluid in all grooves when the machine is operated as a pump.

For the purpose of reciprocating each vane 66 back and forth between the working position at which it obstructs the four grooves and the position at which the vane passes by the reaction blocks in the grooves, each vane 66 is provided at opposite ends with the cam follower faces 75 and 76. The left-hand follower face 75 (FIG. 4) is driven by the camming surface 77 of a cam sleeve 78 inserted into the left-hand end of the machine between the bushing 40 and the end plate 49 and bearing assembly 46. Similarly, the right-hand cam follower surface 76 of vane 66 is driven by the camming surface 79 of a cam sleeve 80 inserted into the right-hand end of the machine between the bushing 40 and the gland 48. The cam sleeves 78 and 80 are adjustable in axial position relative to bushing 40 by the rotation of set screws 81 received threadedly within passages 82 formed at the interface between the bushing and each cam sleeve, the circular bore of each such passage being thereby provided half by the bushing and half by the associated cam sleeve. The mentioned cam sleeves may be so axially adjusted from time to time in order to take up play between the camming surfaces 77, 79 of the sleeves and the cam follower faces 75, 76 of the vanes.

Pressure from a fluid system (not shown) is manifested within the described machine in a manifold 85 which is the high pressure manifold (or alternatively may be the low pressure manifold) and in a manifold 86 which is the low pressure manifold (or, alternatively, may be the high pressure manifold. Both manifolds are in the shape of annular chambers formed between the housing 41 and bushing 40. The manifold 85 is in fluid communication with a pair of radially opposed fluid distribution conduits 87, 88 which are of arcuate form as seen in cross section (FIG. 3), and which (FIG. 4) each extend axially and to the right of manifold 85 between the housing 41 and the bushing 40. Arcuate fins 85a, 85b act as baffles betwen manifold 85 and, respectively, the conduits 87 and 88. Of those conduits the former communicates with a series of high pressure ports 89, 89a, 89b, 89c opening into, respectively, the grooves 55, 55a, 55b, 55c. The latter conduit 88 communicates with a series of high pressure ports of which only port 90 is shown (FIG. 3) but which open into the same grooves in radially opposed relation to the first-named high pressure ports.

The manifold 86 is in fluid communication with a pair of radially opposed fluid distribution conduits 91 and 92 which are of arcuate form as seen in cross section (FIG. 3). Arcuate fins 86a and 86b act as baffles between the manifold 86 and, respectively, the conduits 91 and 92. Of the conduits 91, 92 the former communicates with a series of low pressure ports of which only the port 93 is shown (FIG. 3) but which open into, respectively, the grooves 55, 55a, 55b, 55c. The latter conduit 92 opens into a series of low pressure ports of which only port 94 is shown (FIG. 3) but which open into the same grooves in radially opposed relation to the first-named low pressure ports.

As shown in FIG. 3, around the groove 55, the distribution of ports is such that high pressure ports alternate with low pressure ports. Furthermore, the ports are distributed in relation to the reaction block units 56, 57 in groove 55 so that each reaction block unit has one high pressure port and one low pressure port on opposite sides thereof with the nearer edges of the ports extending substantially up to the central or "block proper" section of the reaction block. The distribution which characterizes the port openings into groove 55 is a distribution which is repeated for the three groups of four ports which open into, respectively, the other three grooves 55a, 55b and 55c of the drum 42. Thus, if each of grooves 55a, 55b, 55c is viewed in the same direction as that which yields the cross section of groove 55 which is shown in FIG. 3, each of grooves 55a, 55b and 55c will be like groove 55 in that the top reaction block will be flanked on the right by a high pressure port and on the left by a low pressure port, and in that the bottom reaction block will be flanked on the right by a low pressure port and on the left by a high pressure port.

The group of axially spaced, angularly aligned ports 89, 89a, 89b and 89c are separated from each other by arcuate ribs 83 which are formed in the bushing 40 by the radial passage therethrough of the port openings. Each such passage is characterized by an axial cross section which resembles a funnel in that slanting chamfer walls 84a taper the cross section from a wide mouth at its radially outward end to a neck at the radially inward end of the passage and formed by vertical walls 84b which bound the passage. Such chamfer walls 84a and vertical walls 84b are shown for port opening 89 in FIG. 4.

Inasmuch as in the considered embodiment the grooves 55, 55a, 55b, 55c and their respectively associated reaction blocks, ports and so on are all substantially identical in structure and operation from groove to groove, the description hereinafter will be confined to the groove 55 and to its associated components. It is to be understood, however, that unless the context otherwise requires, such description applies as well to the other grooves and to their associated reaction blocks, port and the like.

Figure 5:
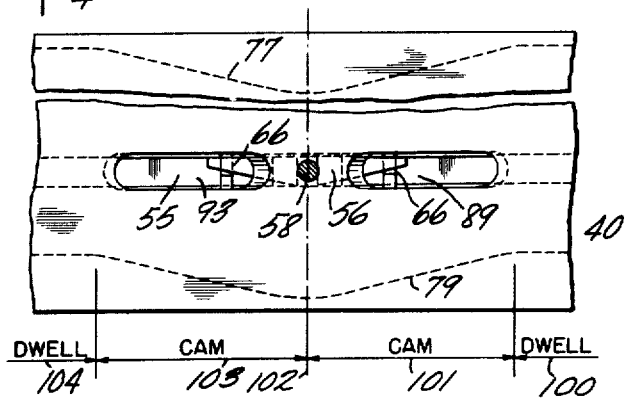
FIG. 5 is a developed plan view, taken over the angular interval indicated by the arrows 5—5 in FIG. 3, of the embodiment of FIG. 3.

FIG. 5 is a developed view of the angular interval around the bushing 40 which includes the reaction block 56 in groove 55, the ports 89 and 93 which open into this groove, and the portions of the camming surfaces 77 and 79 which extend over this angular interval. While the view in FIG. 5 is limited to the angular interval mentioned, the figure is generally illustrative of the space relations obtaining between each reaction block, the associated high and low pressure ports, and the angularly corresponding portions of the camming surfaces.

As shown in FIG. 5, the camming surfaces 77 and 79 are from right to left divided into a dwell section 100, a camming section 101 extending leftward to the axial center line 102 of reaction block 56, another camming section 103 symmetric with cam section 101 about the center line 102 and extending leftward from that center line, and another dwell section 104. For reasons later explained, the shown cam sections 101, 103 each extend at both ends beyond the angular intervals occupied by the corresponding ports 89 and 93.

The shown dwell and cam sections of the camming surfaces are adapted to control as follows the axial position of a vane which is rotating to be represented by a movement from right to left in the developed view of FIG. 5. When the vane is angularly positioned in the dwell section 100, the camming surfaces 77 and 79 maintain the vane axially disposed at the normal position thereof in which a solid portion of the vane obstructs the groove 55 in the drum 42. For this normal working position of the vane, the vane is transversely stationary and the camming surfaces lie in planes which are normal to the axis of the mentioned drum. As the vane moves into the cam section 101, the shown curvatures of the camming surfaces 77 and 79 impart to the vane an axial motion which displaces the vane away from its normal axial position and which is to the right as seen in FIG. 4. The amount of rightward displacement of the vane over camming interval 101 is sufficient to permit the reaction block unit 56 to pass with clearance through the notch 70 in the vane. Hence, in the course of its angular movement, the vane will freely pass by the reaction block.

As the vane in its angular movement makes the transition from camming interval 101 to camming interval 103, the axial motion of the vane changes from a motion of displacement to a motion of replacement which results at the end of the camming interval 103 in a return of the vane to its working position. The vane remains in this last-named position over the angular interval represented by the dwell section 104, and until such time as the vane is again given a new axial motion for the purpose of clearing the reaction block unit 57 which, as shown in FIG. 3, is displaced by 180° from the reaction block unit 56.

The camming surfaces, in order to reciprocate the vanes, must contact the vanes to impart accelerating and decelerating forces thereto. Over a period of time such forces and the motions of the vanes will tend to produce substantial wear on the camming surfaces, and, also, on the vanes. Applicant has found, however, that this wear can be minimized by having the camming intervals of the camming surfaces conform to a curve for which, mathematically speaking, the first derivative is zero and, also, the second derivative is zero at both of the two points on the curve which respectively correspond to the beginning and end of the camming intervals. A curve having such slope characteristics can be readily derived by mathematical procedures known to the art.

From the descriptnon already given of the generalized form of apparatus shown in FIGS. 1 and 2, and from the foregoing description of the practical embodiment shown in FIGS. 3 and 4, the operation of the FIG. 3 and 4 embodiment should be obvious. If the vanes 66 are impelled by fluid which enters by the high pressure manifold 85 and leaves by the low pressure manifold 86, the drum 42 will rotate clockwise as seen in FIG. 3, and the apparatus will act as a motor. If, on the other hand, the vanes 66 impel fluid which enters by low pressure manifold 86 and which leaves by high pressure manifold 85, the drum 42 will be rotated counterclockwise, as seen in FIG. 3, to provide this impulsion action, and the apparatus will operate as a fluid pump. The apparatus can also be converted from a motor to a pump by employing the same clockwise direction of rotation as before of the drum but by reversing the fluid connections to manifolds 85 and 86 so that 85 becomes the low pressure manifold and 86 becomes the high pressure manifold.

Figure 6:
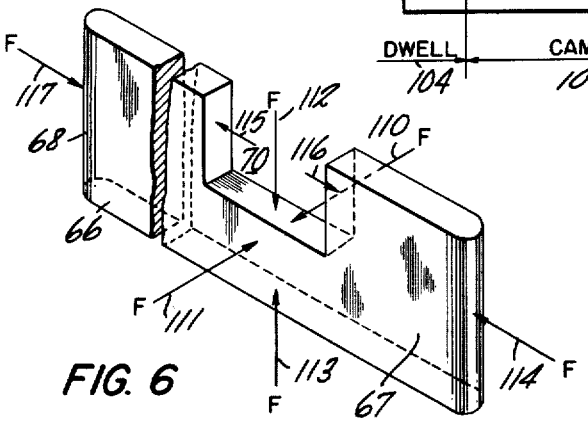
FIG. 6 is an isometric view showing in schematic form one of the vanes in the FIG. 3 embodiment, and the forces exerted on such vane.

As stated heretofore, one of the troublesome problems encountered in apparatus of the sort described is the problem of balancing or otherwise counteracting the fluid pressure forces which act on various mechanical parts. Ideally, such balance or counteraction should be attained in all three of the angular, radial and axial directions which characterize the machine. For a better understanding of what is meant by such balance or counteraction in all three directions, reference is made to FIG. 6 which shows in schematic form one of the vanes 66 of the described apparatus. As indicated by this figure, the represented vane 66 is subjected to leftwardly and rightwardly directed angular forces, represented by the arrows 110, 111; to upwardly and downwardly directed radial forces represented by the arrows 112, 113; and to leftwardly and rightwardly directed axial forces represented by the arrows 114, 115 for rightward forces, and by the arrows 116, 117 for leftward forces. Most of these forces are created by the pressure of the fluid in the apparatus. Consideration will now be given to the various ways in which the described apparatus balances or otherwise neutralizes those fluid pressure forces.

In the embodiment of FIGS. 3 and 4, the pressure of the fluid will act in axially opposite directions on the two side walls 118 and 119 (FIG. 4) of the groove 55 which is formed in the drum 42. Also, the pressure of the fluid will act with equal force in axially opposite directions on the two side walls of the recess 70 which is formed in the vane 66. The balance of forces on the remote end margins of the vanes by means of the channel 45' and the passage 44' has been previously referred to. Therefore, both the drum 42 and the vanes 66 will be axially balanced in respect to fluid pressure forces.

Referring to FIG. 3, the difference in value between the pressure of the fluid at high pressure ports 89, 90 and at low pressure ports 93, 94 is a pressure difference which could produce serious radial unbalance of the machine and of the rotatable member. For example, such serious radial unbalance would exist if there were present only one high pressure port and only one low pressure port. In the shown embodiment, however, this particular problem is overcome by providing at least two high pressure ports which are located at equally spaced angular intervals, at least two low pressure ports which are also located at equally spaced angular intervals, and at least two reaction blocks which are seated at equally spaced angular intervals in the groove. By so providing equally spaced high pressure ports and equally spaced low pressure ports, the radial fluid pressure forces at the high pressure ports act equally and oppositely to cancel each other out. Similarly, the radial pressure forces at the low pressure ports act equally and oppositely to cancel each other out. Therefore, insofar as the ports are concerned, the machine and rotatable member are both balanced in respect to radial pressure forces.

In general this radial balance in respect to the ports may be secured for any number of paired inlet and outlet ports exceeding two pairs by following the technique of distributing the inlet ports at equal angular intervals about the groove, and by distributing the outlet ports at equal intervals about the groove in alternation with the inlet ports. For example, the rotor may be radially balanced in the instance where there are three inlet ports and three outlet ports (and, therefore, three reaction blocks) by distributing the inlet ports at 120° intervals about the groove and by also distributing the three outlet ports at 120° intervals about the groove in alternation with the inlet ports. When the inlet and outlet ports are so distributed, radial balance is obtained at the rotor in respect to the fluid pressure forces at the ports because of the fact that such forces will act on the rotor with respective magnitudes and directions in the radial plane to satisfy the equations for static equilibrium of the rotor in the radial plane. In other words, the algebraic vector sum of all such forces on the rotor in the radial plane will be zero, and the algebraic sum of all moments on the rotor in the radial plane will also be equal to zero.

Where two or more inlet ports and two or more outlet ports communicate with a common groove, it is necessary, to attain radial balance, for the associated reaction blocks to be seated in equally spaced angular relation in such groove. Furthermore, under such circumstances, it is necessary to have equiangularly distributed vanes of a number which (for reasons later explained) is preferably more than twice the number of reaction blocks. This is shown in FIG. 3, wherein the eight shown vanes are equiangularly distributed, and are four times the number of the two reaction blocks 56, 57. With the conditions just stated being met, an excellent radial balance of the machine is obtained.

In the apparatus, the vanes 66 are subjected to a fluid pressure force which acts in the radially inward direction. This force tends to press the vanes against the bottoms of the axial slots 65 to thereby render it difficult to reciprocate the vanes in the slots.

The problem just mentioned may be overcome in the presently described apparatus by providing the following elements which are shown in FIG. 4:

(a) Apertures 120 passing radially through each vane 66 and axially disposed so that each aperture is at the center of a corresponding one of the grooves 55, 55a, 55b, 55c when the vane is in working position;

(b) Cavities 121 formed in the bottom of each slot 65 directly below grooves 55, 55a, 55b, 55c, respectively, each cavity being axially coextensive with its corresponding groove, and one of the apertures 120 opening into each cavity;

(c) Passages 122 extending from the central notches of each vane 66 to the bottom margin of the vane such passages being provided, for example, by shallow radial extending channels formed on both sides of the vane below the notches; and (d) Recesses 123 formed in the bottom margin of each vane 66 directly below the notches thereof, each such recess being axially coextensive with the corresponding notch and being in fluid communication with the channel 122 extending radially inward from that notch.

The above-described combination of elements serves to equalize the fluid pressure forces which act upon the top and bottom of each vane. The equalization of such forces eliminates much of the friction involved in moving the vanes in their slots.

Figure 7:
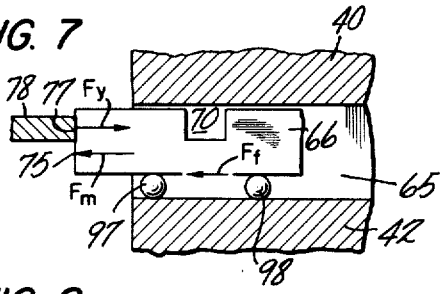
FIG. 7 is a schematic view in side elevation of a vane in a machine of the type shown in FIG. 3, and of the action of forces thereon.

Instead of counteracting by equalization of fluid pressure forces the tendency of the radially inward fluid pressure force to lock the vanes in their slots, it is possible to counteract this tendency by providing ball bearing mountings for the vanes. In connection, however, with such type of mounting (and with other types of mountings as well), there arises the problem which is illustrated in FIG. 7. In the schematic diagram of this figure, a vane 66 is represented as being supported above the bottom of its slot 65 by the ball bearings 97 and 98, the vane being driven from left to right by the camming surface 77 of the cam sleeve 78. To produce this driving action, the camming surface 77 exerts on the vane 66 a force which, together with its center line of action, is indicated by the arrow $F_y$. This driving force is opposed by two forces, namely (a) a force which, together with its center line of action, is indicated by the arrow $F_m$, and which is equal to the mass of vane 66 as multiplied by its acceleration; and (b) a force which, together with its center line of action, is indicated by the arrow $F_f$, and which is a frictional force exerted by the bearings 97, 98 on the bottom of vane 66. The resultant of forces $F_m$ and $F_f$ is a force which acts in the opposite direction to driving force $F_y$ and which is equal in magnitude thereto, but which has a center line of action displaced radially inward of the center line of action of the force $F_y$. This radial displacement between driving force $F_y$ and the resultant of forces $F_m$ and $F_f$ produces on vane 66 a clockwise moment tending to cant the vane and thereby either force the left-hand end of the vane against bushing 40, or, alternatively, force the right-hand end of the vane (not shown) against the bottom of slot 65. In other words, the described camming of the vane tends to lock the vane against movement in its slot.

Figure 8:
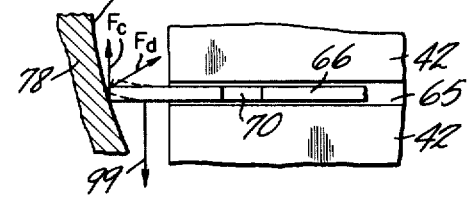
FIG. 8 is a schematic plan view of a vane in a machine of the type shown in FIG. 3, and of the action of forces thereon.

Another vane mounting problem is illustrated schematically in FIG. 8. In this last-named figure, the drum 42 is assumed to be rotating so as to produce peripheral movement of the vane 66 in the direction indicated by the arrow 99. The camming surface 77 of cam sleeve 78 is inclined relative to this direction of peripheral movement so as to axially displace the vane 66 from left to right within its slot 65. The drum 42, vane 66 and camming surface 77 have a relative disposition such that the left-hand end of vane 66 projects outwardly to the left-hand end of drum 42 in order to make contact with the camming surface.

In this situation the inclination of camming surface 77 causes this surface to exert on vane 66 a driving force $F_d$ which is at an angle to the axis of the vane, and which accordingly has a component $F_c$ acting on the left-hand end of the vane at right angles to its axis. Inasmuch as the projecting portion of left-hand end of the vane is in the nature of a cantilever beam in that no lateral support is provided for such portion except at its base, the effect of the action of the component $F_c$ is to produce a significant lateral deflection of the unsupported vane portion. This lateral deflection will, when present, serve as another factor tending to cause jamming of the vane against movement in its slot.

Figure 10:
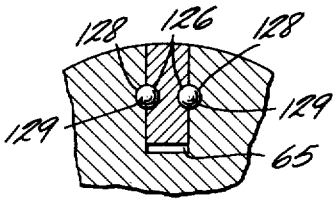
FIG. 10 is a view in cross section taken as indicated by the arrows 10—10 in FIG. 9 of the modified vane.
Figure 11:
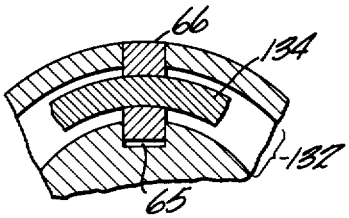
FIG. 11 is a view in cross section, taken as indicated by the arrows 11—11 in FIG. 9 of the modified vane.
Figure 9:
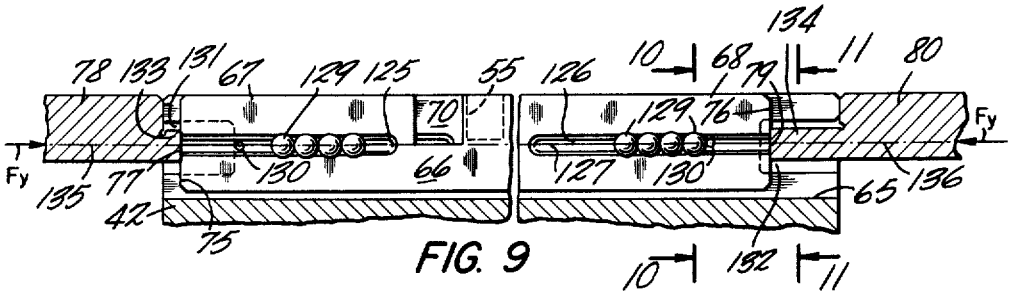
FIG. 9 is a detail view in front elevation and partially in cross section, of a modified vane of the FIG. 3 machine.

The problems illustrated in FIGS. 7 and 8 are overcome by the vane and cam construction shown in FIGS. 9, 10 and 11. In this construction, a pair of rounded grooves 125 are formed on opposite sides of vane 66 to extend inwardly from its left-hand end face 75. A similar pair of grooves 126 are formed on opposite sides of vane 66 to extend inwardly to its right-hand end face 76. The center lines of all grooves coincide with the axial line 127 which is the center line of mass for vane 66 in the sense that the mass of the vane disposed radially outward of line 127 equals the mass of the vane disposed radially inward of that line. Because of the notches which are formed in vane 66, the center line 127 of mass does not necessarily coincide with the vane's geometric center line, i.e., that line which lies halfway between the radially inward and outward margins of the vane.

As shown in FIG. 10, the rounded grooves 126 in vane 66 are matched by a pair of rounded grooves formed in the side walls of slot 65. Similarly, the grooves 125 of the vane are matched by rounded grooves (not shown) formed in the mentioned side walls of the slot. Each vane groove and each matching slot groove form a guideway within which is received a set of ball bearings 129. The ball bearings are retained within such guideway by pins 130 which pass crosswise through vane 66 to project on both sides of the vane into the grooves on opposite sides thereof.

As will be noted from FIG. 10, the ball bearings 129 support vane 66 in such a manner that the vane is held above the bottom of slot 65, it is also held away from the side walls of the slot, and, further, is constrained so as not to be removable from the slot by force applied in the radially outward direction. Thus, the described ball bearing mounting for the vane has a number of advantages. For example, the mounting precludes the generation of a large frictional drag opposing axial motion of the vane and due to the pressing of the vane against the bottom of its slot by fluid pressure force acting radially inwardly on the top margin of the vane. Furthermore, inasmuch as the mounting holds the vane away from the sides of its slot to thereby maintain sidewise clearance at all times between vane and slot, the mounting precludes the development of friction force opposing axial motion of the vane and arising out of a pressing of the vane against one side of the slot as a result of an unbalance of the fluid pressure forces acting on opposite sides of the vane. Still further, in the instance where the described machine is run at high speed, the ball bearing mounting of FIG. 9 precludes the throwing of a vane out of its slot by centrifugal force.

In the construction shown in FIGS. 9 and 11, the vane 66 is contacted by the the camming surfaces 77, 79 in the following manner. The drum 42 has formed therein, at its left-hand and right-hand ends, respectively, a pair of [angular] *annular* channels 131 and 132 of rectangular cross section which extends axially into the drum from those ends. The channels 131 and 132 transect all of the slots 65 which are formed in the drum. The cam sleeve 78 has formed at its right-hand extremity an annular flange 133 which projects axially into channel 131 so as to dispose all points on the camming surface 77 within that channel. Similarly, the cam sleeve 80 has formed at its left-hand extremity an annular flange 134 which projects axially into channel 132 so as to dispose all points on the camming surface 79 within that last-named channel. Because the camming surfaces 77 and 79 are both insheathed by the drum throughout their entire peripheries, there is no time during the cycle of axial reciprocation of the vane in which a portion of the vane projects beyond its slots 65. Hence, all portions of the vane receive lateral support at all times and there cannot occure the undesirable 'cantilever'" deflection which is illustrated by FIG. 8.

Besides being axially located within channels 131, 132 of the drum 42, the camming surfaces 77 and 79 are radially located in relation to the vane 66 in such manner that the driving forces $F_y$ exerted by those surfaces have center lines 135, 136 which coincide with and are extensions of the center line of mass 127 of the vane 66. Because of this coincidence and because, as described, the ball bearings 129 which mount vane 66 are disposed along the common center line for the driving forces and for the vane mass, there is no tendency for the vane to become canted in its slot as the vane is driven back and forth by the cams. Hence, the construction shown in FIG. 9 eliminates the problem discussed in connection with FIG. 7.

In respect to pressure fluid forces which act in an angular direction on the vanes, such forces will always be unbalanced when the vanes are being effective to provide a motor action or a pumping action. This is so, since, when the described apparatus is being used as a motor, it is the presence of this unbalanced which drives the vanes, and, since, when the apparatus is being used as a pump, the action of the vanes will produce this unbalance of angularly acting forces. Therefore, an unbalance of angular forces on the vanes is, in fact, desirable so long as the vanes remain stationary in their groove obstructing or working position. When, however, any vane is disposed in those angular intervals of its angular movement in which the vane is given either one of the reciprocal axial motions which displace the vane from its normal working position to its block-passing position to its normal working position, it has been considered hitherto that an unbalance of angularly directed fluid pressure forces becomes undesirable. The reasoning behind this opinion which has been held is that any such unbalance tends to press the vane against one of the walls of its containing slot to thereby make it more difficult to reciprocate the vane in the slot. However, as later explained in further detail, I have found that despite this consideration, a considerable improvement in capacity or horsepower can be obtained by extending the camming sections of the camming surfaces to occupy an angular interval greater than that over which a vane is angularly balanced in respect to fluid pressure forces.

Figure 12:
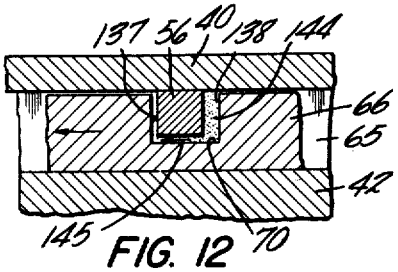
FIG. 12 is a view in side elevation and vertical cross section showing in detail the cooperation between a vane and a reaction block in the FIG. 3 embodiment.

FIG. 12 shows another problem which has been overcome in the presently described apparatus. As a vane 66 reciprocates back and forth in its slot in order to pass by reaction block, there is a tendency for fluid to be trapped in the space between the block and one of the side walls 137, 138 of the rectangular recess 70 in the vane. In FIG. 12, this trapped condition of the fluid is shown in the instance where the vane 66 is in the course of passing by the block 56, the vane has just started to undergo the axial movement to the left which will return the vane from block-passing position to its normal working position, and fluid is present in the space 144 between the right-hand wall 138 of the recess 70 and the right-hand surface of the block. It is evident that the presence of this fluid in the mentioned space creates an obstruction to the fast return of the vane 66 to working position.

The difficulty just mentioned can be avoided by forming the recess 70 in vane 66 to extend radially inward of the bottom of the annular groove 55 which is formed in the drum 42. Since the bottom of the reaction block 56 cannot be disposed any further inward than the bottom of groove 55, the radial deepening of the recess 70 creates within slot 65 an axially running passageway 145 between the bottom of the reaction block and the radially inward margin of reces 70. This passageway permits flow of fluid in substantial amount from one side to the other of the reaction block. Accordingly, as the vane 66 moves to the left in the course of returning from its block-passing position to its normal working position, the fluid in the diminishing space to the right of block 56 is fluid which can freely flow out of this right-hand space, through the mentioned passageway, and into the space which is opening to the left of block 56 between the left-hand surface thereof and the receding left-hand wall of the recess 70. Obviously, when the vane 66 is moving to the right in the course of going from its normal working position to its block-passing position, the fluid in the space to the left of block 56 can likewise flow through the mentioned passageway and around to the space which in that instance will be opening to the right of the block 56.

It will be appreciated that other means may be employed to avoid fluid trapping, as, say, one or more apertures formed in the reaction block to pass axially therethrough. Such apertures will be later described.

Figure 13:
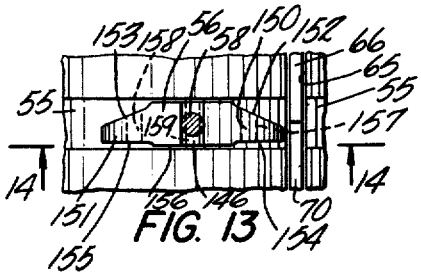
FIG. 13 is a plan view showing details of a reaction block in the FIG. 3 embodiment.
Figure 14:
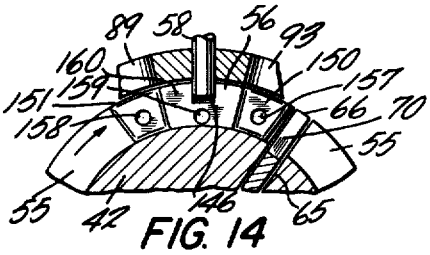
FIG. 14 is a view in front elevation and in vertical cross section, taken as indicated by the arrows 14—14 in FIG. 13, of the reaction block shown in FIG. 13.

FIGS. 13 and 14 show details of the reaction blocks used in the described apparatus, and of the mode of coupling those reaction blocks to the bushing 40. As indicated by those figures, the reaction block 56 is anchored to the bushing 40 by the pin 58 which passes through an aperture in the bushing and into an axial slot 146 which is formed in the block. The pin thereby couples the block in angularly fixed relation with the bushing. At the same time, relative axial movement can take place between the pin and the axial slot 146 in which the pin rides. Hence, the reaction block 56 is adapted to move axially to thereby adjust itself to a shift in the axial position of the groove 55 relative to the bushing 40. This relative shift in axial position between groove and bushing is likely to take place in small amounts over a period of time because of wear induced in the described apparatus during continued operation thereof. Also, irrespective of wear, some shift may take place in operation because of differences in thermal expansion of various parts of the machine.

While the described pin and slot coupling provides the desired effect of self adjustment of the reaction block to slight shifts in axial position of the groove 55, an inevitable result of such type of coupling is the creation of a certain amount of play in the seating of the block in the groove 55. This play tends to get worse as the groove and block wear. Also, the block is subjected to an unbalance of angularly directed fluid pressure forces in that a high pressure port is located on one side of the block, and a low pressure port is located on the other side thereof. These two factors of play, in the mounting of the block and of an unbalance of the angular pressure forces thereon, are factors which, in combination, will tend to cant the block in the groove. However, such canting is prevented in the presently described apparatus by two winglike projections 150 and 151 which extend outwardly from opposite sides of the reaction block proper and into the annular groove 55. As shown in FIG. 14, the extensions 150 and 151 are arcuately curved to fit snugly in the annular groove 55.

The extensions 150 and 151 are also shaped, as shown in FIG. 13, to respectively have the tapers 152, 153 on the sides thereof which would be to the right in FIG. 4, and to respectively have the shoulders 154, 155 on the sides thereof which would be to the left in this last-named figure. The advantages of each of these two shaped portions of each of the mentioned extensions will now be considered in turn.

The efficiency of operation of the described apparatus can be maximized by minimizing the angular interval over which each vane is maintained fully axially displaced from its normal working position for the purpose of allowing the vane to pass by a reaction block. The principle just stated is true for the reason that, any interval over which the vanes are fully displaced subtracts from the angular intervals over which the vanes are cammed. and, as pointed out hereafter, the greatest efficiency of operation can be obtained by making such camming intervals as long as possible. If the described extensions of the reaction block had no tapers, the vanes, in order to pass the block, would, in effect, have to be maintained fully displaced from working position over the whole angular interval occupied by the block and by its extensions. However, with the extensions being tapered as shown, the angular intervals occupied by the extensions are intervals which can and do overlap with the angular intervals over which the vanes are in axial motion from normal working position to block-passing position and from block-passing position back to working position. Hence, the combination of the extensions 150, 151 and the tapers thereon is a combination which enables the prevention of canting of the block with no substantial accompanying loss in the efficiency of operation of the apparatus.

While the tapering, as described, of the extensions 150, 151 solves one difficulty, it creates another in that fluid in the groove 55 will act upon the tapered areas 152, 153 with an axially directed pressure force. This force, if unopposed. will create unwanted friction between the block 56 and the wall 156 of the groove 55 towards which such axial pressure forces urge the block. Further, inasmuch as the axially directed pressure forces on tapered areas 152, 153 are unequal because of the fact that the block has high pressure and low pressure on opposite sides thereof, such forces if unopposed will produce on the block a moment tending to rotate it around pin 58 and thereby jam the extension on the high pressure side of the block against the side of groove 55. Those last-named difficulties are, however, avoided in the described apparatus by providing the shoulders 154, 155 which are formed in the extensions 150, 151 axially opposite the tapers 152, 153. The presence of such shoulders in the extensions 150, 151 create respective open spaces between such extensions and the mentioned wall 156 of groove 55. These open spaces receive fluid which is under pressure, and which in such spaces exerts on the extensions 150, 151 an axially directed pressure force which is equal and opposite to the axial pressure force exerted on the tapered areas 152, 153 of the extensions. In such circumstances, each extension will be balanced in respect to axial fluid pressure forces, and the block 56 will not be subject to a moment and will not bear with undue force against the side 156 of the groove 55.

If desired, the balance of axial pressures can be improved by forming in the extensions 150, 151 respective apertures 157, 158 which axially pass through the extensions between the shoulders thereof and the tapered sides thereof and by forming in the block proper 160 of the reaction block unit an aperture 159 which axially passes from side to side through the block proper 160. All those apertures will assist in precluding trapping of fluid between a vane and the reaction block as the vane reciprocates to pass by the block and to then return to working position. As a further measure to avoid fluid trapping, preferably the tapered surfaces 152, 153 of the extensions 150, 151 are curved to be axially equidistant at all points from the camming surface 77. If the tapered surfaces are so curved, the separation between those surfaces and the adjacent vertical side of notch 70 of vane 66 is a separation which remains constant as the vane passes by the reaction block. If desired, however, the tapered surfaces may be of any shape permitting clearance between the extensions 150, 151 and the vane.

Coming now to the matter of improving the capacity as a pump of the described machine, for any one groove the capacity C per block is given by:

$$C=hwv \qquad (1)$$

where h equals the groove width, w is depth and v is the peripheral velocity of the vanes relative to the block. The product hwv also expresses horsepower per block per groove when the machine acts as a motor. The peripheral velocity v is, of course, equal to the centroidal radius of the cross sectional area of the groove times the angular velocity at that radius of the vanes relative to the block.

Figure 15A:
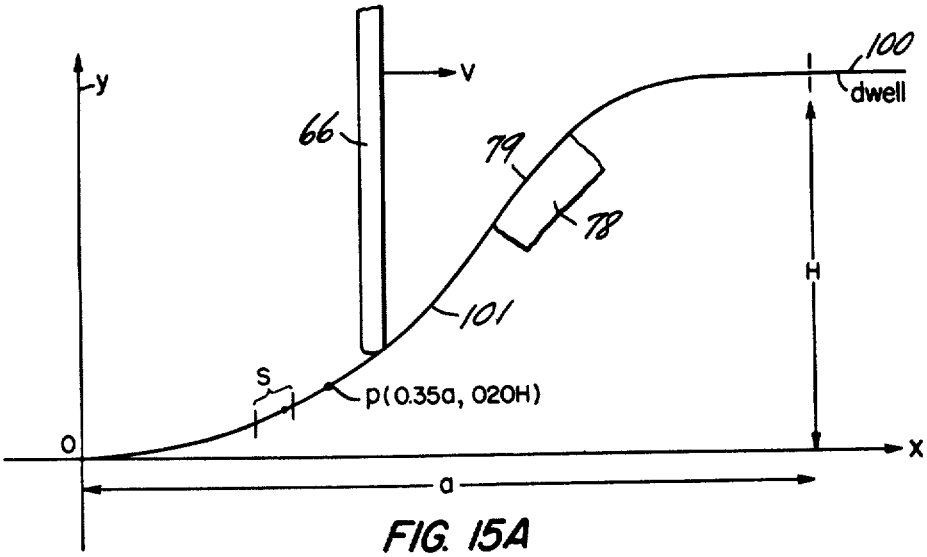
FIGS. 15A and 15B are adaptations of the developed view in FIG. 5 and are schematic diagrams of aid in explaining certain quantitative relations inhering in the FIG. 3 machine.

For fixed values of h, w and the centroidal radius of the groove, evidently the capacity C increases in proportion with v. However, v cannot be increased without limit. For an understanding of what determines the maximum permissible value of v, reference is made to FIGS. 15A and 15B. FIG. 15A illustrates schematically the camming section 101 of the camming surface 79 (FIG. 5). For the purpose of FIG. 15A, the vane 66 is assumed to be moving from left to right with velocity v. As the vane so moves from origin O to the point where camming section 101 joins dwell section 100, the vane is axially thrown in the y direction by the distance H. The throw H in practice always exceeds somewhat the width h of the groove but theoretically can approach h. Hence, for analysis purposes, Expression 1 can be written in the form:

$$C=Hwv \qquad (2)$$

The cam section 101 occupies an interval a along the x axis between origin O and the point of joinder with dwell section 100. This interval a will be assumed to be variable, the same assumption being made at a later time for the interval H. However, the profile of section 101 is treated herein as constant in the sense that the x, y coordinates of any point on this section will be the same for all values of a and H when the x coordinate is expressed as a percentage of a and the y coordinate is expressed as a percentage of H. Thus, for example, the x, y coordinates for the shown point p will always be, say, 0.35a, 0.20H, however, a and H may vary.

Figure 15B:
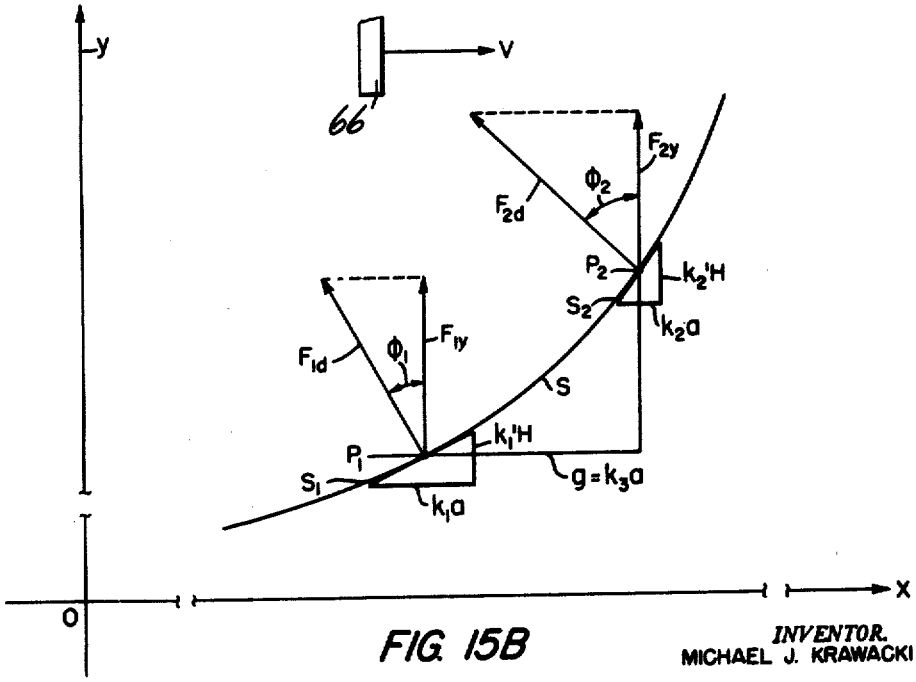

FIG. 15A shows for the camming section 101 a segment S which is reproduced in enlarged form in FIG. 15B. Referring to this last-named figure, the points $p_1$ and $p_2$ are points in S which are displaced from origin O by a fixed percentage of a as, say, 27% of a for $p_1$ and 27.01% of a for $p_2$. The horizontal interval g between $p_1$ and $p_2$ may be expressed as $k_3a$ inasmuch as when a increases, g increases proportionately.

The segment S at points $p_1$ and $p_2$ has, respectively, the slopes $s_1$ and $s_2$. These slopes $s_1$ and $s_2$ may be equated to, respectively, the expression $k'_1H/k_1a$ and $k'_2H/k_2a$ inasmuch as such slopes vary inversely with a and directly with H. Thus, for example, if a is doubled in value, each of $s_1$ and $s_2$ will be halved in value, but if H is doubled in value, $s_1$ and $s_2$ will likewise be doubled in value.

As vane 66 moves with peripheral velocity v over segment S to arrive at points $p_1$ and $p_2$ at, respectively, the times $t_1$ and $t_2$, the axial or y velocities of vane 66 at those points are given by the expressions:

$$y'_1=S_1V \tag{3}$$

$$y'_2=S_2V \tag{4}$$

Further, the average axial or y acceleration of vane 66 between points $p_1$ and $p_2$ is:

$$y''=\frac{S_2V-S_1V}{t_2-t_1} \tag{5}$$

However, $(t_2-t_1)$ equals g/v. Therefore $$y''=\frac{(S_2V-S_1V)V}{g} \tag{6}$$

$$y''=\frac{(S_2-S_1)V^2}{k_3a} \tag{7}$$

or $$y''=\frac{(k'_2H/k_2a-k'_1H/k_1a)V^2}{k_3a} \tag{8}$$

or $$y''=k_4HV^2/a^2 \tag{9}$$

The force $F_y$ exerted by segment S in the axial direction on vane 66 is equal to the constant mass of the vane times the aceleration imparted thereto. In other words $$F_y=my'' \tag{10}$$

or from (9)

$$F_y=k_5HV^2/a^2 \tag{11}$$

However, the force $F_y$ is a component of the force $F_d$ exerted by segment S at any point thereon in a direction normal to the slope of the segment at that point. Thus, as shown at point $p_1$, the forces $F_{1d}$ and $F_{1y}$ form a right triangle having $F_{1d}$ for the hypotenuse and $F_{1y}$ for one side thereof. This triangle is similar to the right triangle at $p_1$ which defines the slope $s_1$ and which has the sides $k'_1H$ and $k_1a$ and, acordingly the hypotenuse $$\sqrt{(k_1a)^2+(k'_1H)^2}$$

The legs $F_{1d}$ and $F_{1y}$ of the force triangle correspond with the legs $\sqrt{(k_1a)^2+(k'_1H)^2}$ and $k_1a$ of the similar slope triangle. Therefore:

$$\frac{F_{1d}}{F_{1y}}=\frac{\sqrt{(k_1a)^2+(k'_1H)^2}}{k_1a} \tag{12}$$

or $$F_{1d}=F_{1y}=\frac{\sqrt{(k_1a)^2+(k'_1H)^2}}{k_1a} \tag{13}$$

Similarly, for point $p_2$ it can be shown that:

$$F_{2d}=F_{2y}\frac{\sqrt{(k_2a)^2+(k'_2H)^2}}{k_2a} \tag{14}$$

Hence, for any point:

$$F_d=F_y\frac{\sqrt{Ka^2+K'H^2}}{ka} \tag{15}$$

and substituting the value for $F_y$ expressed in (11) into (15), there is obtained:

$$F_d=\frac{k_5HV^2}{a^2}\left(\frac{\sqrt{Ka^2+K'H^2}}{ka}\right) \tag{16}$$

or $$F_d=\frac{k_6HV^2}{a^2}\left(\frac{\sqrt{Ka^2+K'H^2}}{a}\right) \tag{17}$$

Now, if $\phi$ is the angle at any point on s which exists between the forces $F_d$ and $F_y$ at that point, and which is known as the "pressure angle" for that point, it is the case that:

$$\sec\phi=\frac{\sqrt{Ka^2+K'H^2}}{ka} \tag{18}$$

and Expression 16 becomes:

$$[F_d=k_5HV^2/a^2\sec\phi]\ F_d=\frac{k_5HV^2}{a^2}(\sec\phi) \tag{19}$$

I have found that the factor which ultimately limits the improvement in capacity or horsepower of the described machine is the stress set up in axially driving the vanes by the camming surfaces. In other words, no matter what changes are made in cam throw H, peripheral velocity v of the vanes or interval a of the camming sections, such changes must not result in producing a value for the mentioned stress which exceeds a limiting value therefor, such limiting value being determined by, among other factors, the strength of the materials used. I have also found that the value of the mentioned stress varies directly with the force $F_d$. Therefore, for any given machine there is a maximum practical value $F_{dmax}$ for $F_d$, the value $F_{dmax}$ being a constant. This consideration leads to a rewriting of (19) as:

$$[k_5HV^2/a^2\sec\phi\leq F_{dmax}]\ \frac{k_5HV^2}{a^2}(\sec\theta)\leq F_{dmax} \tag{20}$$

In (20), given that $F_{dmax}$ is a constant and assuming for the time being that H is constant, if sec $\phi$ is treated as a constant, then v can be increased at least linearly with an increase in a. This is so since if a is, say, doubled, then v can also be doubled without increasing the value of $V^2/a^2$, whereby $F_{dmax}$ is not exceeded. However, from (2) it is evident that the capacity C of the machine increases linearly with v. Therefore, the increase in a permits at least a linear increase in capacity C.

As a matter of fact, with constant H an increase in a permits a more than linear increase in v. This is so for the reason that by inspection of (18) it will be seen that, as a increases in value, sec $\phi$ decreases in value to approach 1. However, from (20) it is evident that when sec $\phi$ decreases in value with increasing a, the decrease in sec $\phi$ permits the adding to the linear increase in v of an extra increase in v up to the point where the left-hand side of (20) equals the right-hand side thereof. In order to determine how much extra increase in v can be added to the linear increase in v, sec $\phi$ is taken for that point of the entire camming section profile (FIG. 15A) where the pressure angle $\phi$ is maximum.

It is also to be noted that when the peripheral velocity V is fixed, as it is in many applications, and that when H is treated as a variable and can be increased while keeping the mass of the vane constant, an increase in a permits increasing the capacity C of the machine almost as the square of a. This follows from the fact that when in (20) the term $V^2$ is a constant and when sec $\phi$ is also treated as a constant, if a is say, doubled, the quantity H may be quadrupled without $F_{dmax}$ being exceeded by the left-hand side of 20. However, if H is quadrupled, it is apparent from (2) that, to an approximation, the doubling of a produces a quadrupling of the capacity C.

Actually, the increase in C is affected by factors other than the square of the increase in a. This is so for two reasons. First, as H is increased, the value of sec $\phi$ increases somewhat, and, in order to continue to satisfy (20), this increase in sec $\phi$ must be compensated for by keeping H down to a value which is somewhat less than proportional to the square of a as a increases. On the other hand, since the groove width h (which really determines capacity) may be less by a constant value than H as H increases, the factor increases percentage-wise somewhat faster than H to thereby tend to offset any loss in capacity attributable to the increase in sec $\phi$. Therefore, in most instances the capacity C can be increased almost as the square of a by increasing H to the highest value thereof which will satisfy (20).

From the foregoing it is evident that it is highly advantageous to increase the intervals a occupied by the camming sections of the camming surfaces of the described machine. Before, however, describing how those camming intervals are increased, according to the invention, it is necessary to consider some of the factors which determine the length of those camming intervals.

Figure 16:
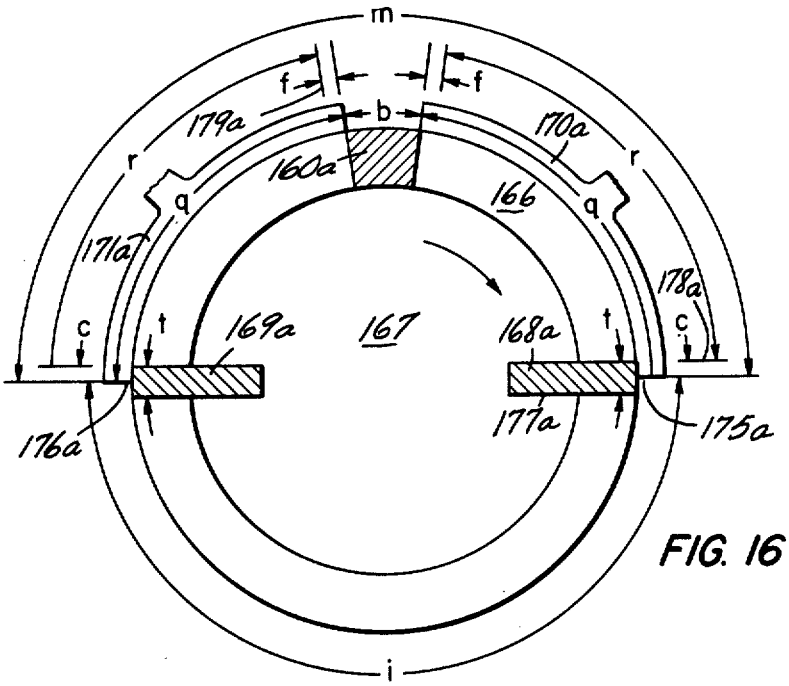
FIG. 16 is a schematic diagram of a cross section of a machine of the type shown in FIG. 3, the diagram supplementing FIG. 15 as an explanatory aid, and being representative of a rotary motion, aligned impulsion machine having one reaction block and two vanes.

Referring to FIG. 16, this figure is a schematic diagram of a rotary motion aligned impulsion machine having the block proper portion 160a of a reaction block seated in a groove 166 formed in a clockwise rotating drum 167, two vanes 168a, 169a spaced in 180° relation around the drum and rotating therewith, a high pressure port 170a on one side of the block and a low pressure port 171a on the other side of the block. The structure of FIG. 16 is not a preferred embodiment inasmuch as there is only one reaction block and, hence, the cross section of the machine through groove 166 is not radially balanced. However, the FIG. 16 structure provides the best starting point for the ensuing discussion.

In the FIG. 16 machine, over a travel of 360° around the groove, each vane goes through one complete operating cycle of working, axial displacement to pass the block and axial replacement to working position. Thus, in the FIG. 16 machine the vane operating cycle has a value of 360°. On the other hand in the FIG. 17 machine (which has two blocks and four vanes) one complete vane operating cycle takes place over 180° around the groove. From such considerations can be derived the general rule that:

$$D=360/B \qquad (21)$$

where D is the vane operating cycle angle and where B is the number of blocks per groove.

It is desirable that, in the machines to which this invention relates, the angular extent of the ports be made as large as possible since, as later explained, the angular intervals which can be devoted to camming the vanes are intervals which increase as the port angles increase. The two possibilities for increasing the angular extent of a given port adjacent a given reaction block are (a) an increase in the direction away from the block and (b) an increase in the direction towards the block. Considering the former possibility, the edges 175a, 176a of ports 170a and 171a are the far edges of such ports in relation to the block 160a. Those edges coincide with the center lines of vanes 168a, 169a when those vanes are in the position shown. In other words, the closest angular interval by which the far edges of the ports 170a, 171a approach each other is the inter-port angle i which for FIG. 16 is 180°, the same as the angle of separation for this figure of the two vanes. This angle of separation sets a limit to the inter-port angle i since if the angle i is any less than the angle of separation, the high pressure port will be separated from the low pressure port around the angular interval i by less than one vane thickness t when the vanes are in the position shown. It follows that an interval i of less than the vane angle of separation will result in excessive leakage or short circuiting of fluid around the interval i.

Inasmuch as the vanes are equiangularly distributed, the angle of separation between each two adjacent vanes of N total vanes is 360/N. If there are n vanes per block the angle of separation is 360/nB. As stated, in extending the ports away from block proper 160a, the inter-port angle i between the extended port edges 175a, 176a should be no less than the vane angle of separation. Thus, the minimum value for i is given by:

$$i=360/nB \qquad (22)$$

Figure 17:
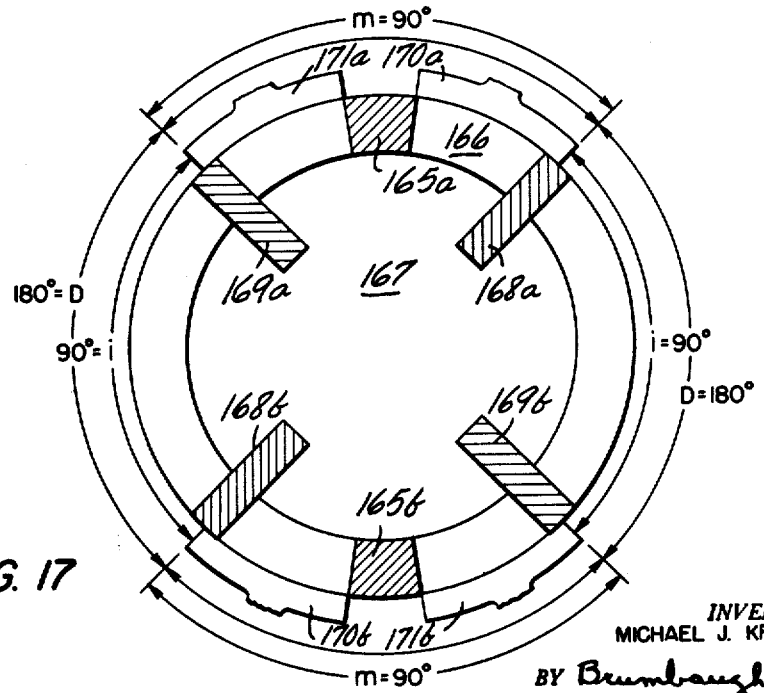
FIG. 17 is a schematic diagram of a cross section of a machine of the type shown in FIG. 3, the diagram supplementing FIGS. 15 and 16 as an explanatory aid, and being representative of a machine having two reaction blocks and four vanes.

Formula (22) is a general formula as can be verified by inspection of FIG. 17 wherein there are two blocks 165a, 165b, two vanes for each block and wherein, as predicted by the formula, the angle i between the edges adjacent to each other of, respectively, the ports 170a, 171b are edges which are spaced by 90°.

In connection with the foregoing discussion it is to be noted that the inter-port angle i is substantially coincident with the angular interval over which each vane is both subjected to a differential in the fluid pressure forces acting on opposite sides thereof and, at the same time, does useful work. For this reason the angle i may be considered as the working angle or interval for each vane.

The angular interval left over in the vane operating cycle angle D after subtraction therefrom of the inter-port angle i will be referred to as the non-working angle m. From (21) and (22) it is clear that:

$$m=360/B-360/nB \qquad (23)$$

or $$m=360/B(1-1/n) \qquad (24)$$

The formula in (24) is again a general one. To demonstrate, if B equals 2 and n equals 2, the formula predicts a non-working angle m of 90°. This value characterizes the non-working angle m in each of the two 180° vane operating cycle angles D for the machine of FIG. 17 wherein there are two blocks and two vanes for each block.

Considering now the possibility of increasing the angular extents of each port in the direction of the reaction block adjacent thereto, the edge of that port which is near the reaction block can be brought into registry with the block proper, i.e., that part of the block which (except for clearance) occupies the entire axial dimension of the groove in which it is seated. Beyond this, the angular extent of the port in this direction can be increased only by decreasing the angular interval b occupied by the block proper. The optimum value for this interval is twice the thickness t of the individual vanes where t is expressed in degrees. The reason why 2t is the optimum value for b is that such value equalizes the leakage in the angular direction of fluid past the block with the fluid leakage in the angular direction past each vane when in working position. To wit, fluid leaks past each vane through the interface between the vane and the bushing, such vane leakage being roughly proportional to t. However, fluid can leak past the block proper both through the interface between block proper and housing and through the interface between block proper and the bottom of the groove, the leakage past the block thus being twice that of the leakage past a vane for the same angular thickness of both elements. It follows that by making the angular thickness of the block proper equal to twice that of each vane, the fluid leakage past the two elements will, roughly speaking, be equalized.

In instances where the mounting of the block is of a type permitting self-adjustment of the block in axial position, the heretofore described play in the block and the resultant possibility of canting of the block by the unequal pressures on its opposite sides are factors which would ordinarily render it impossible to reduce the thickness of the block proper to a value of 2t. However, I have found that by providing the described winged extensions, I can overcome this difficulty associated with an axially self-adjusting block so that the angular thickness of the block proper can without difficulty be reduced to a value of 2t or less.

From the relationship which obtains in FIG. 16 between the non-working angle m, the block angle b and the angular interval of each port, and from the expression for m which is given by (24), it is clear that when the block angle b equals 2t, the maximum angle q for each port is given by the general formula:

$$q=\tfrac{1}{2}[360/B(1-1/n)-2t] \qquad (25)$$

or $$q=180/B(1-1/n)-t \qquad (26)$$

It is desirable to so minimize the port angle because this angle is the same as that for which a vane is balanced in respect to fluid pressure forces acting on its opposite sides, and (subject to later mentioned exceptions) the camming interval a is limited in its maximum angular extent to this balanced pressure region.

Within each such port angle there are certain angular positions of the vanes which are of particular interest. Those angular positions will now be considered.

First, assume that in FIG. 16 the vane 168a is not in the position shown but instead is approaching the far edge 175a of high pressure port 170a as the drum 167 rotates clockwise. In the course of such approach the vane 168a reaches an angular region wherein the flow of fluid from port 170a into the lower half of groove 166 is dynamically throttled by the progresive closure of the gap between the leading edge 177a of the vane and the far edge 175a of the port. Such throttling has the direct consequence of reducing the pressure on the leading edge 177a of vane 168a and on the lagging edge of the working vane 169a, the ultimate consequence of the throttling thereby being to shift the work load from vane 169a to vane 168a. While the described throttling action builds up an inequality of the fluid pressure forces acting on opposite sides of vane 168a even before the leading side 177a of this vane reaches port edge 175a, a definite position at which this pressure inequality exists is the position 178a at which the center line of vane 168a is separated by an angle c equal to t/2 from the port edge 175a towards which the vane is approaching. At this position the leading edge 177a of vane 168a just registers with port edge 175a to completely cut off the flow of fluid from port 170a. At position 178a, therefore, there is no question but that less fluid pressure force is exerted on the leading side of vane 168a than on the lagging side thereof.

Second, as vane 169a approaches block 160a, the vane undergoes, as described, an axial motion of displacement for the purpose of pasing by the block. Let us assume that it is desired that this passing by of the block be accomplished with the minimum possible throw H of the vane. For this assumed condition, it will be evident that the vane must have undergone its full axial displacement when the leading edge of the vane reaches the block. In practice, full displacement would have to be obtained slightly before the leading edge just registers with the near edge of the block. This is so inasmuch as some clearance must be allowed for. For analysis purposes, however, the position at which the assumed condition of minimum possible H requires full displacement of the vane is a position which will be taken as occurring where the leading edge of vane 169a just registers with the edge adjacent thereto of block proper 160a. When the leading edge is so positioned, the center line of vane 169a is at the position 179a which is spaced by the angle f equal to t/2 from the near edge of the block.

The angle q of any port minus the angles c and f within that port angle may be defined as the vane sub-port angle r inasmuch as it is only within this angle r that a vane is wholly underneath a port. From the foregoing, it is apparent that the sub-port angle r is given by the expressions:

$$r=180/B(1-1/n)-\frac{b}{2}-t/2-t/2 \qquad (27)$$

or (where b=2t)

$$r=180/B(1-1/n)-2t \qquad (28)$$

Heretofore, it has been believed that the camming section associated with any port should terminate at its end towards the reaction block at an angular position which is spaced by greater than the angle f from the near edge of the block proper in order thereby to permit use of the minimum possible axial throw H for the vane. It has also been believed that the camming section at its edge away from the block should terminate at an angular position which is spaced by greater than angle c from the edge of the port farthest from the reaction block. The reasoning behind this latter belief is that, if the camming section were to extend any further, the vane would be in axial motion while being subjected to unequal pressure forces on opposite sides, but, if the vane were to be subjected to unequal lateral pressure while in axial motion, friction, stress and wear would be created by the binding of the vane against one side of its slot as a result of the unbalance of lateral pressure thereon.

To summarize the above, it has previously been believed that the angular camming interval a associated with a given port should be less than the sub-port angle r for that port. It has further been believed that the working interval i should be maximized at the expense of the camming intervals a.

I have found that those previously-held beliefs are mistaken, and that a significant improvement in capacity or horsepower can be realized by proceeding contrary to those beliefs. Specifically, I have found that, in contrast to what has previously been taught, the camming intervals a should be increased in any one or more of the ways of (I) extending a towards the blocks to an angular position which in any event is closer than t/2 to the near edge of the block and which may be the center line of the block, (II) extending a away from the block to an angular position which in any event is spaced closer than t/2 to that edge of the associated port which is the far edge in relation to the block, and which angular position may extend beyond such far edge, and (III) employing more than two vanes per block, whereby each vane workin interval i is decreased to permit a corresponding increase in the camming intervals a which lie to either side of that working interval.

Figure 18:
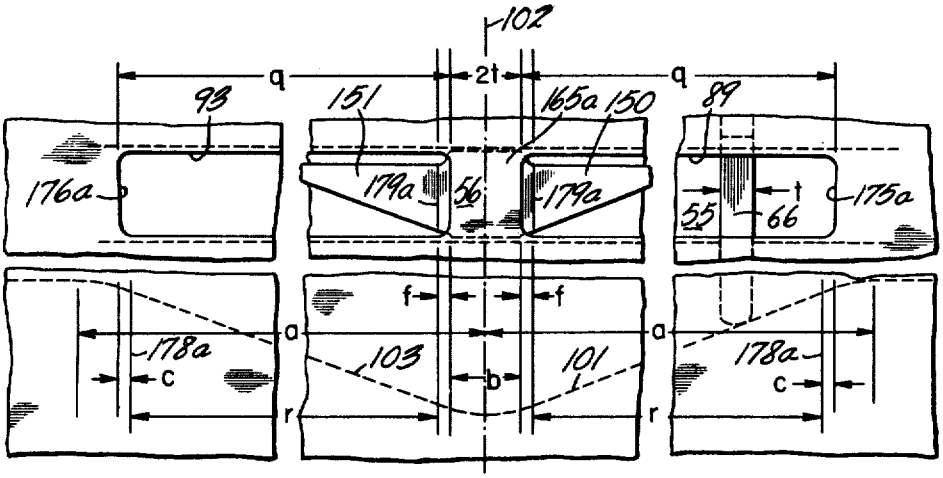
FIG. 18 is a developed view corresponding to the developed views of FIGS. 5 and 15 and showing the extent of the camming intervals in the FIG. 3 machine.

FIG. 18 illustrates ways I and II of increasing camming intervals a. In respect to I, each of the camming sections 101 and 103 extends all the way to the center line 102 of the reaction block 56. In order to so increase those camming sections it is necessary to increase the throw H of the vanes beyond the maximum value of H which could be used if the camming intervals terminated short of positions 179a. However, the percentage increase in H which is necessary to carry the intervals a all the way to the center line of the reaction block is small in relation to the percentage increase in a which such increase in H permits. This is so for two reasons. First, inasmuch as the camming sections 101 and 103 follow, as described, a curve for which both the first and second derivatives are zero at the ends of the camming sections, those sections will have segments of relatively flat profile at the ends thereof adjacent the reaction block, and, for those flat profile segments, a increases much faster than H. Second, for reasons heretofore described, the winged construction of the reaction block permits the block proper 165a of the axially self-adjusting block to be reduced to the optimum angular thickness of 2t, and such reduction of the block thickness keeps the increase in H which is required to a much lower value than would be necessitated if the thickness of the block proper were to be substantially in excess of 2t.

When the camming sections 101 and 103 are so extended to the center line 102 of the reaction block, the portions of those sections extending from angular positions 178a to center line 102 are equal to:

$$180/B(1-1/n)-t/2 \qquad (29)$$

By comparison with (28) it will be seen that those portions alone of the camming sections exceed the sub-port angle r of (28) which in turn is larger than the entire camming interval hitherto considered as the practical maximum.

In respect to way II of increasing the camming intervals a, for sections 101, 103, as shown by FIG. 18, those camming sections extend away from the reaction block beyond the positions 178a and in fact, beyond the edges 175a, 176a of ports 89 and 93 which are the far edges of those ports in relation to the reaction block. The segments of camming sections 101, 103 which are to the far side of angular positions 178a are segments occupying angular intervals wherein a vane is subject to an unbalance of lateral pressure forces. However, I have found that because the sections 101 and 103 follow curves wherein the first and second derivatives are zero at the point of joinder of each of those sections with the adjacent dwell section of the camming surface, the outlying end segments of those sections are sufficiently flat in profile to permit such sections to extend a short distance into the region of pressure unbalance of the vanes. Specifically, each such end segment may, at the least, extend far enough into the region of pressure unbalance to (1) permit clearance to be taken up between the camming surfaces and the cam follower end faces of the vanes, and, (2) stress the vanes by a driving force $F_d$ up to the value $F_{dmax}$ which is the maximum value permitted.

When the camming sections 101 and 103 are extended only so far as the edges 175a, 176a of ports 89 and 93, the portions of those camming sections between angular positions 179a and edges 175a, 176a are portions which each have an angular interval of:

$$180/B(1-1/n)-3t/2 \qquad (30)$$

which is greater than the sub-port angle r given by (28). Thus each of those portions of themselves exceed the maximum value of camming interval which has hitherto been considered practical.

Figure 19:
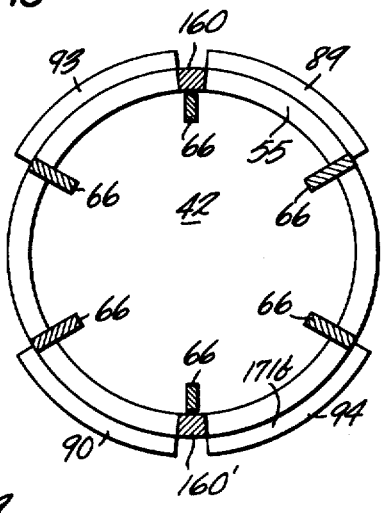
FIG. 19 is a schematic diagram of a cross section of the FIG. 3 machine as modified to have six vanes.
Figure 20:
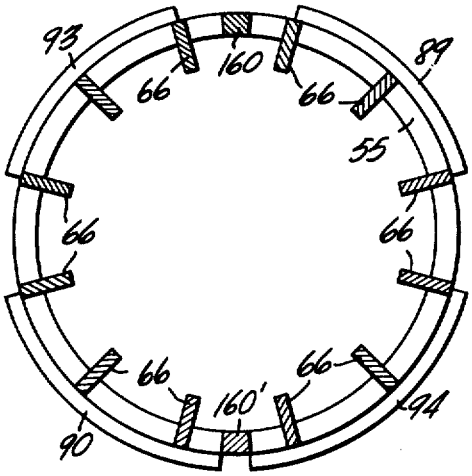
FIG. 20 is a schematic diagram of a cross section of the FIG. 3 machine as modified to have twelve vanes.

A comparison of FIGS. 19, 4 and 20 with FIG. 17 demonstrates the increase in the camming intervals a which is obtainable by increasing the number of vanes. In FIG. 19 there are three vanes per block for each of two blocks as compared to FIG. 17 wherein there are only two vanes per block for each of two blocks.

Let it be assumed for the structures of both FIGS. 17 and 19 that each vane has an angular vane thickness t of 4° and that each camming interval a extends over only the sub-port angle r. Then applying Formula 28, the values for the intervals a in the FIG. 17 and FIG. 19 structures are, respectively, the angular values of 37° and 51°. In other words, the effect of increasing the number of vanes per block from two to three is to permit at the least a 38% increase in the value of the camming intervals a. However, in the instance where the peripheral velocity v is fixed and where, as described, the maximum capacity (or horsepower) of a machine hence varies approximately as the square of a, a 38% increase in a results to an approximation, in an increase of 1.91 fold in maximum capacity. Of course, if the camming intervals a are increased further by extending them, as described, beyond each of the angular positions 178a and 179a, the increase in maximum capacity becomes even greater. For example, if each of such intervals is extended to the center line of their corresponding reaction block and to the far edge of the corresponding port, the intervals a in FIG. 19 become equal to 60° which value is 62% greater than 37°, whereby the increase in maximum capacity is over two-fold.

The foregoing discussion makes evident the fact that as the working interval i per vane is decreased (by increasing the number of vanes per block), such decrease permits an increase in the angle which can be subtended by the ports. When this increased angle is fully utilized as port angle, there is increased thereby the angle over which the vanes are balanced in respect to lateral fluid pressure forces, the latter angle in large part determining the practical angular extent of the camming interval a. When advantage is taken under those conditions to increase a, this leads to an increase in the maximum capacity of which a machine of given size is capable, and this increased maximum capacity can be obtained whether the block angle b equals 2t or is of greater value. In this connection, it is to be noted that, for a constant value of camming interval a, a decreased working interval resulting from an increase in the number of vanes per block is a change in structure which in no way adversely affects the capacity of the machine. This is so, inasmuch as when the working interval per vane is so decreased, the number of vanes which work over unit time is offsettingly increased and, therefore, the capacity remains the same.

As the number of vanes is progressively increased, the maximum capacity of the machine is also progressively increased. For example, if the number of vanes is increased from three vanes per block as in FIG. 19 to four vanes per block as in FIG. 4, when the same assumptions are made as before (namely, that t equals 4° and that the camming interval a equals the sub-port angle r), then for FIG. 4 the camimng interval a has from Formula 28 a value of 59.5° as compared to a value of 37° for FIG. 19. An interval of 59.5° is 61% greater than 37° and leads to a potential improvement of about 2.6 fold in the capacity of the machine.

As another example, if the number of vanes is further increased to six per block as in FIG. 20, then, with the same assumptions as before, from Formula 28 the camming interval a for FIG. 20 is 67°. This 67° figure is 81% greater and 12.6% greater than the camming intervals for, respectively, the structures shown in FIGS. 19 and 4, wherefore, the maximum capacity attainable in the FIG. 20 machine exceeds by 3.28 fold and 1.27 fold the maximum capacities in, respectively, the FIG. 19 and FIG. 4 machines.

Evidently, the technique of increasing the camming interval a by increasing the number of vanes per block is not limited to a two-block machine but is applicable also to a machine having three or more blocks or to a machine having say, only one block per groove. For example, in the case of a one block machine wherein the number of vanes per block is progressively increased from two to four to six, with such increase in vanes (and assuming that t equals 4° and a equals r), the corresponding increase in the camming interval a is (by Formula 28) from 82° to 127° to 142°.

*The total length of the cam throw H, that is the distance that the vane travels in its path transversely to the groove, in relation to the angular movement of the vane during said transverse movement thereof, is a factor of considerable importance in providing long life of the machine and minimum impact between the cam and its follower. This relation is expressed by the ratio of H/a where H and a have the meanings assigned and discussed above. As indicated above, it is desirable to have H/a as low as possible. In FIGURE 9, the total cam throw taken as the difference between the lengths of the cams 133 and 134 from their respective mountings 78 or 80 or taken as the vane notch width is measured about* $^{12}/_{32}$ *of an inch.*

*The value of a, the angular cam extent, measured in degrees may be determined from FIGURE 5 as about 58°. In determining the appropriate linear cam extent, it is the minimum radius of the cam as shown, for in-*

*stance, in FIGURE 4, which must be considered because obviously the cam will have its smallest linear extent and therefore its greatest angle relative to the angular displacement at this minimum radius. By applying the value π appropriately to such minimum radius, it is found that the minimum value a for the drawing illustrated is about 1.2 inches. Thus*

$$a=2\pi\frac{a(\text{in degrees})}{360^\circ}$$

*R' (where R' is the radius of the cam in question*=1.18)=*1.2 inches.*

*Comparing the value of H measured from FIGURE 9 with the value of a as determined above, it is found that the ratio H/a determined from FIGURE 9 is* .31.

*By similarly evaluating FIGURE 13, i.e., using a groove width of* 13/32 *of an inch, and a clearance of* 3/64, *as determined above, and also a value of vane overlap of* 1/32 *inch also as determined above, it is found that the value of H in FIGURE 13 is* .48 *inch. Taking the value of a, the linear cam extent as the same value measured from FIGURE 5, it is found that the value of H/a in FIGURE 13 is* .40.

Further, in order to realize an increase in capacity by increasing the number of vanes it is not necessary that the camming interval a be increased to the maximum extent permitted by the decrease in working interval i resulting from the vane increase. Thus, using one block machines as an example, a six-vane one-block machine inherently permits the camming interval a to be greater than the limiting value for a which characterizes a four vane one-block machine (this limiting value being rounded off, to say, 135°). For any value of a in the six-vane one-block machine which exceeds the limiting value 135° for a in the four-vane one-block machine, the machine with the higher number of vanes per block will have a greater potential maximum capacity than the machine with the lower number of vanes per block. The same considerations apply to machines having two or more blocks. As an illustration of this fact a machine with three vanes per block and two blocks is capable of a better capacity than a machine with two vanes per block and two blocks for any camming interval a of the three vane per block machine which exceeds the limiting value for the two vane per block machine, this latter limiting value being rounded off to, say, 45°.

The above-described embodiments being exemplary only, it will be understood that the invention hereof comprehends embodiments differing in form and/or detail from the above-described embodiments.

For example, the invention is of application to rotary motion aligned impulsion machines in which there are a fractional number of vanes per block as, say, a machine having five vanes and two reaction blocks per groove. Further, although the embodiments described herein are suitable for high speed operation, the invention hereof is applicable to rotary motion aligned impulsion machines designed for use at any speed of operation.

While specific embodiments of the invention have been shown in which the cylindrical sleeve (or casing) is stationary and the drum rotates, the principles of the invention may be applied and used in machinery designed to have the sleeve (or casing) rotate while the drum remains stationary. In other modifications, the vanes may move radially in radial (instead of axial) slots, the relatively rotatable members having planar faces, one face having an annular groove and the other having the reaction block affixed thereto and seated in the groove. Such radial machine would also differ from the axial machine shown in FIGS. 3 and 4 in that the flow of fluid between the groove and the ports would be in an axial direction, the variations from dwell position of the cam guiding surfaces for imparting transverse movement to the one or more vanes would be radial rather than axial variations, and, in respect to the reaction block and vanes, what was axial in FIGS. 3 and 4 would become radial and what was radial in FIGS. 3 and 4 would become axial. As specific illustrations, in the radial machine the reaction block would project axially rather than radially from the stationary member into the annular groove of the rotor (although the extensions 150, 151 would still project angularly from the reaction block), and, in a vane of the type shown in FIG. 4, the apertures 120, 122 would run axially through the vane between axially opposite margins thereof rather than (as specifically shown in FIG. 4) radially through the vane between radially opposite margins thereof.

Accordingly, the invention is not to be considered as limited save as is consonant with the scope of the following claims.

I claim:

1. In a rotary motion aligned impulsion machine in which at least one reaction block unit is coupled in angularly fixed relation with a first of a pair of relatively rotatable members and is seated in a continuous fluid receiving groove formed in the second of said members, at least one vane is received in transversely movable relation within a slot formed transversely of said groove in said second member, said vane being adapted by relative rotation of said members to move angularly relative to said block unit over an angular interval for which said vane is transversely stationary in working position to obstruct said groove by a solid vane portion, and also, over two angular intervals of vane transverse motion which are disposed on opposite sides of the center line of said block unit and in which, respectively, said vane passes said block unit by shifting transversely from working position to remove said portion from said groove, and said vane shifts transversely back to working position, and in which machine a camming means is disposed adjacent said second member to provide a camming surface adapted by contacting a cam follower face on said vane to control the transverse position thereof, the improvement in said machine comprising a reaction block proper forming at least part of said block unit and extending transversely from side to side of said groove, and a pair of curvilinear camming sections forming angular extents of said camming surface which lie to either side of the center line of said block proper, and which shifts said vane transversely within said transverse motion intervals, each camming section having a profile of variation in transverse displacement with angular displacement which extends towards said center line beyond the angular position which is angularly spaced outwardly of the edge of the block proper nearest such camming section by half the angular thickness of the vane.

2. The improvement as in claim 1 in which the profile of each camming section extends towards the center line of the block proper beyond the edge of such block proper nearest to such camming section.

3. The improvement as in claim 2 in which the profile of each camming section extends to the center line of said block proper.

4. The improvement as in claim 1 in which said block proper has an angular thickness which at most is twice that of the vane.

5. The improvement as in claim 1 further comprising ports opening into said groove on either side of said block proper and each extending away from said block proper to a far edge spaced from the center line of said block proper by $$(180^\circ/B)(1-1/n)$$

where B is the number of blocks per groove and n is the number of vanes per block and has a value of at least 2, the profile of each of said camming sections extending away from said block proper co-angularly with a corresponding port to a point beyond the angular position which is spaced from the far edge of such port and towards said block proper in an amount equal to half the angular thickness of said vane.

6. The improvement as in claim 1 in which said reaction block proper has an angular thickness which is at most twice that of the vane, said improvement further comprising ports opening into said groove on either side of said block proper and each extending away from said block proper to a far edge spaced from the center line of said block proper by $$(180°/B)(1—1/n)$$

where B is the number of blocks per groove and n is the number of vanes per block and has a value of at least 2, the profile of each of said camming sections extending away from said block proper through the angle subtended by a corresponding port of a point beyond the angular position which is spaced from the far edge of such port and towards said block proper in an amount equal to half the angular thickness of said vane.

7. In a rotary motion aligned impulsion machine in which at least one reaction block unit is coupled in angularly fixed relation with the first of a pair of relatively rotatable members and is seated in a continuous fluid receiving groove formed in the second of said members, a plurality of equiangularly-spaced similar vanes are received in transversely movable relation within slots [which are respective thereto] *of which each corresponds to a respective one of said vanes,* and which are formed in said second member to extend therein transversely of said groove, said vanes being adapted by relative rotation of said members to each move angularly relative to said block unit over an angular working interval for which the vane is transversely stationary in working position to obstruct said groove by a solid vane portion, and, also, over two angular intervals of vane transverse motion which are disposed on opposite sides of said working interval and in which, respectively, the vane passes said block unit by shifting transversely from working position to remove said solid portion from said groove, and said vane shifts transversely back to working position, and in which machine a camming means is disposed adjacent said second member to provide a camming surface adapted by contacting a cam follower face on each of said vanes to control the transverse position thereof, and a pair of ports open into said groove on opposite sides of said working interval, the improvement in said machine comprising a pair of curvilinear camming sections forming angular extents of said camming surface which lie to either side of said working interval and which shift each of said vanes transversely within said transverse motion intervals, each camming section having a profile of variation in transverse displacement which extends towards the center of said working interval beyond the angular position which is spaced from such interval by half the angular thickness characterizing the vanes.

8. The improvement as in claim 7 in which the profile of each camming section extends towards the center of said working interval beyond the port edge which marks the end of said working interval nearest said profile.

9. The improvement as in claim 7 in which the profile of each camming section occupies an angular interval greater than $$(180°/B)(1-1/n)-2t$$

where B is the number of block units per groove, n is the number of vanes per block and t is the angular thickness of each vane.

10. The machine described in claim 7 in which each of said ports has an edge adjacent said working interval which is separated from such edge of the other port by an angle which at most is equal to the angular spacing between adjacent ones of said vanes to thereby render said working interval at the most equal to said spacing.

11. In a rotary motion aligned impulsion machine in which at least one reaction block unit is coupled in angularly fixed relation with the first of a pair of relatively rotatable members and is seated in a continuous fluid receiving groove formed in the second of said members, a plurality of equiangularly-spaced similar vanes are received in transversely movable relation within slots [which are respective thereto] *of which each corresponds to a respective one of said vanes,* and which are formed in said second member to extend therein transversely of said groove, said vanes being adapted by relative rotation of said members to each move angularly relative to said block unit over an angular working interval for which the vane is transversely stationary in working position to obstruct said groove by a solid vane portion, and, also, over two angular intervals of vane transverse motion which are disposed on opposite sides of said working interval and in which, respectively, the vane passes said block unit by shifting transversely from working position to remove said solid portion from said groove, and said vane shifts transversely back to working position, and in which machine a camming means is disposed adjacent said second member to provide a camming surface adapted by contacting a cam follower face on each of said vanes to determine the transverse position thereof, and a pair of ports open into said groove on opposite sides of said working interval, the improvement in said machine in which said plurality of vanes exceeds four in number for each block unit which is present, said improvement further comprising a block proper forming at least part of said block unit and extending transversely from side to side of said groove, said block proper having an angular thickness of b, and a pair of curvilinear camming sections forming angular extents of said camming surface which lie to either side of said working interval and which shift each of said vanes transversely within said transverse motion intervals, each of said camming sections occupying an angular extent which exceeds $$(180°/B)(1—1/4)—b/2—t$$

where B is the number of blocks per groove and t is the angular thickness of each vane.

12. The improvement as in claim 11 in which each of said camming sections occupies an angular extent greater than $$(180°/B)(1-1/n)-2t$$

where n is the number of vanes per block.

13. In a rotary motion aligned impulsion machine in which at least two equiangularly spaced reaction block units are coupled in angularly fixed relation with a first of a pair of relatively rotatable members and are seated in a continuous fluid receiving groove formed in the second of said members, a plurality of equiangularly-spaced similar vanes are received in transversely movable relation within slots [which are respective thereto] *of which each corresponds to a respective one of said vanes,* and which are formed in said second member to extend therein transversely of said groove, said vanes being adapted by relative rotation of said members to each move angularly relative to each block unit over an angular working interval, respective to such unit, for which the vane is transversely stationary in working position to obstruct said groove by a solid vane portion, and also, over two angular intervals of vane transverse motion which are disposed on opposite sides of such working interval and in which, respectively, the vane passes a block unit by shifting transversely from working position to remove said solid portion from said groove, and said vane shifts transversely back to working position, and in which machine a camming means is disposed adjacent said second member to provide a camming surface adapted by contacting a cam follower face on each of said vanes to control the position thereof, the improvement in said machine in which said plurality of vanes exceeds two in number for each block unit which is present, said improvement further comprising a block proper forming at least part of said block unit and extending transversely from side to side of said groove, said block proper having an angular thickness of b, and a plurality of pairs of camming sections forming angular extents of said camming surface, the sections in each pair thereof being disposed on opposite sides of a respective one of said working intervals and being adapted to shift each of said vanes transversely within the transverse motion intervals to either side of that working interval, and each camming section occupying an angular interval greater than $$(180°B)(1—1/2)—b/2—t$$

where B is the number of block units per groove and t is the angular thickness of each vane.

14. The improvement as in claim 13 in which each camming section occupies an angular interval greater than $$(180°/B)(1-1/n)-2t$$

where n is the number of vanes per block unit.

15. The improvement as in claim 14 in which each camming section occupies an angular interval greater than $$(1800/B)(1—1/n)—3/2t$$

16. The improvement as in claim 15 in which each camming section occupies an angular interval greater than $$(180°/B)(1-1/n)-t$$

17. The improvement as in claim 16 in which each camming section occupies an angular interval greater than $$(180°/B)(1-1/n)$$

18. In a rotary motion aligned impulsion machine in which at least one reaction block unit is coupled in angularly fixed relation with the first of a pair of relatively rotatable members and is seated in a continuous fluid receiving groove formed in the second of said members, a plurality of equiangularly-spaced similar vanes are received in transversely movable relation within slots [which are respective thereto] *of which each corresponds to a respective one of said vanes,* and which are formed in said second member to extend therein transversely of said groove, said vanes being adapted by relative rotation of said members to each move angularly relative to said block unit over an angular working interval for which the vane is transversely stationary in working position to obstruct said groove by a solid vane portion, and, also, over two angular intervals of vane transverse motion which are disposed on opposite sides of said working interval and in which, respectively, the vane passes said block unit by shifting transversely from working position to remove said solid portion from said groove, and said vane shifts transversely back to working position, and in which machine a camming means is disposed adjacent said second member to provide a camming surface adapted by contacting a cam follower face on each of said vanes to determine the transverse position thereof, the improvement in said machine in which said plurality of vanes exceeds two in number for each block unit which is present, said machine further comprising, a reaction block proper forming at least part of said block unit and extending transversely from side to side of said groove, said block unit having an angular thickness at most equal to 2t where t is the angular thickness of each vane, and a pair of curvilinear camming sections forming angular extents of said camming surface which lie to either side of the center line of said block proper, and which shift said vane transversely within said transverse motion intervals, each camming section occupying an angular interval greater than $$(180°/B)(1-1/2)-2t$$

where B is the number of block units per groove.

*19. In a rotary motion aligned impulsion machine in which at least two equiangularly spaced reaction block units are coupled in angularly fixed relation with a first of a pair of relatively rotatable members and are seated in a continuous fluid receiving groove formed in the second of said members, a plurality of equiangularly-spaced similar vanes are received in transversely movable relation within slots of which each corresponds to a respective one of said vanes, and which are formed in said second member to extend therein transversely of said groove, said vanes being adapted by relative rotation of said members to each move angularly relative to each block unit over an angular working interval, respective to such unit, for which the vane is transversely stationary in working position to obstruct said groove by a solid vane portion, and, also, over two angular intervals of vane transverse motion which are disposed on opposite sides of such working interval and in which, respectively, the vane passes a block unit by shifting transversely from working position to remove said solid portion from said groove, and said vane shifts transversely back to working position, said solid vane portion in said working position extending beyond both transverse side walls of said groove thereby to provide a substantial overlap of said solid vane portion and said slot adjacent said groove, and in which machine a camming means is disposed adjacent said second member to provide a camming surface adapted by contacting a cam follower face on each of said vanes to control the position thereof, the improvement in said machine in which said plurality of vanes exceeds two in number for each block unit which is present, said improvement further comprising a block proper forming at least part of said block unit and extending transversely from side to side of said groove, said block proper having an angular thickness of b, said camming means including a camming section adapted to shift each vane transversely within a transverse motion interval during which shifting the edge of said solid vane portion crosses a transverse side wall of said groove in accordance with said overlap, the profile of said camming section occupying an angular interval greater than*

$$(180°/B)(1-1/2)-b/2-t$$

*where B is the number of block units per groove and t is the angular thickness of each vane.*

*20. In a rotary motion aligned impulsion machine in which at least two equiangularly spaced reaction block units are coupled in angularly fixed relation with a first of a pair of relatively rotatable members and are seated in a continuous fluid receiving groove formed in the second of said members, a plurality of equiangularly-spaced similar vanes are received in transversely movable relation within slots of which each corresponds to a respective one of said vanes, and which are formed in said second member to extend therein transversely of said groove, said vanes being adapted by relative rotation of said members to each move angularly relative to each block unit over an angular working interval, respective to such unit, for which the vane is transversely stationary in working position to obstruct said groove by a solid vane portion, and, also, over two angular intervals of vane transverse motion which are disposed on opposite sides of such working interval and in which, respectively, the vane passes a block unit by shifting transversely from working position to remove said solid portion from said groove, and said vane shifts transversely back to working position, and in which machine a camming means is disposed adjacent said second member to provide a camming surface adapted by contacting a cam follower face on each of said vanes to control the position thereof, the improvement in said machine in which said plurality of vanes exceeds two in number for each block unit which is present, said improvement further comprising a block proper forming at least part of said block unit and extending transversely from side to side of said groove, said block proper having an angular thickness of b, said camming means including a camming section adapted to shift each vane transversely within a transverse motion interval, and the profile of such camming section occupying an angular interval greater than*

$$(180°/B)(1-1/2)-b/2-t$$

*where B is the number of block units per groove and t is the angular thickness of each vane, and in which machine the ratio H/a of the distance of said transverse shifting*

*of said vanes during said transverse motion interval (H), to the developed length of said angular camming section (a) defined as*

$$a = 2\pi \frac{a'(in\ degrees)}{360^\circ} R'$$

*where a' is the angular extent of the camming section and R' is the minimum radius of the camming surface, is not greater than about 0.40.*

References Cited by the Examiner

The following references, cited by the Examiner, are of record in the patented file of this patent or the original patent.

UNITED STATES PATENTS

| | | | |
|---|---|---|---|
| 797,869 | 8/05 | Scott | 121—89 |
| 895,488 | 8/08 | Morehouse | 102—139 |
| 953,430 | 3/10 | Moukos | 103—139 |
| 959,856 | 5/10 | Hardy | 121—89 |
| 1,042,696 | 10/12 | Lehne | 103—139 |

| | | | |
|---|---|---|---|
| 2,020,611 | 11/35 | Knapp | 103—139 |
| 2,154,456 | 4/39 | Knapp | 103—139 |
| 2,154,457 | 4/39 | Knapp | 103—139 |
| 2,154,458 | 4/39 | Knapp | 103—139 |
| 2,466,622 | 4/49 | Tucker et al. | 103—139 |
| 2,466,623 | 4/49 | Tucker et al. | 103—139 |
| 2,869,472 | 1/59 | Hartmann | 103—123 |

FOREIGN PATENTS

| | | |
|---|---|---|
| 1,141,233 | 3/57 | France. |
| 219,902 | 1907 | Germany. |
| 10,518 | 1910 | Great Britain. |
| 21,188 | 1910 | Great Britain. |
| 29,777 | 1909 | Great Britain. |
| 155,786 | 10/21 | Great Britain. |
| 602,465 | 5/48 | Great Britain. |
| 2,234 | 11/17 | Netherlands. |

DONLEY J. STOCKING, *Primary Examiner.*

JOSEPH H. BRANSON, Jr., *Examiner.*